(12) United States Patent
Kadota et al.

(10) Patent No.: US 12,306,072 B2
(45) Date of Patent: May 20, 2025

(54) INSPECTION DEVICE FOR ROTARY ELECTRIC MACHINE AND INSPECTION SYSTEM FOR ROTARY ELECTRIC MACHINE

(71) Applicant: MITSUBISHI GENERATOR CO., LTD., Kobe (JP)

(72) Inventors: Naoya Kadota, Tokyo (JP); Daichi Goto, Tokyo (JP); Yoshihiro Morimoto, Tokyo (JP); Daisuke Mizuno, Tokyo (JP); Yasuki Hattori, Tokyo (JP)

(73) Assignee: MITSUBISHI GENERATOR CO., LTD., Kobe (JP)

( * ) Notice: Subject to any disclaimer, the term of this patent is extended or adjusted under 35 U.S.C. 154(b) by 332 days.

(21) Appl. No.: 17/764,749

(22) PCT Filed: Jan. 16, 2020

(86) PCT No.: PCT/JP2020/001275
§ 371 (c)(1),
(2) Date: Mar. 29, 2022

(87) PCT Pub. No.: WO2021/144917
PCT Pub. Date: Jul. 22, 2021

(65) Prior Publication Data
US 2022/0381650 A1 Dec. 1, 2022

(51) Int. Cl.
*G01M 99/00* (2011.01)
*H02K 11/20* (2016.01)
(52) U.S. Cl.
CPC ............. *G01M 99/00* (2013.01); *H02K 11/20* (2016.01)
(58) Field of Classification Search
CPC ...... G01M 13/00; G01M 99/00; H02K 11/20; H02K 15/00; H02K 11/21; H02K 23/20;
(Continued)

(56) References Cited

U.S. PATENT DOCUMENTS 5,650,579 A * 7/1997 Hatley ................. B62D 55/065
348/E7.086
6,568,869 B1 * 5/2003 Murata .................. B62D 57/02
446/129
(Continued)

FOREIGN PATENT DOCUMENTS

| CN | 105073470 A | 11/2015 |
|----|-------------|---------|
| JP | 2017138315 A | 8/2017 |

OTHER PUBLICATIONS

Extended European Search Report dated Dec. 14, 2022, issued in corresponding European Application No. 20914636.4. (9 pages).
(Continued)

*Primary Examiner* — Giovanni Astacio-Oquendo
*Assistant Examiner* — Martin Walter Braunlich
(74) *Attorney, Agent, or Firm* — BUCHANAN, INGERSOLL & ROONEY PC

(57) ABSTRACT

An inspection device includes: a base; a linear motion mechanism which performs linear motion; a link mechanism which has a driven link connected to the base, and which extends/contracts by the linear motion performed by the linear motion mechanism; a connection mechanism for connecting between a driving link of the link mechanism and the linear motion mechanism; and a sensor. The connection mechanism has a link connection portion connected to the link mechanism, and a ball nut that moves in conjunction with the linear motion performed by the linear motion mechanism. When a force higher than or equal to a predetermined force is applied to the link mechanism, the link connection portion is separated from the ball nut so as to contract the link mechanism.

14 Claims, 12 Drawing Sheets

(58) Field of Classification Search
CPC ........ H02K 23/66; H02K 5/225; H02K 7/116;
H02K 41/00; H02K 9/19; H02K 7/003;
H02K 5/00; H02K 41/031; G01R 31/311;
G01R 31/318307; G01R 31/318342;
G01R 31/31835; G01R 35/005; B62D
57/02; Y10S 901/46; Y10S 901/01; Y10S
901/44
See application file for complete search history.

(56) References Cited

U.S. PATENT DOCUMENTS

| | | | |
|---|---|---|---|
| 10,197,538 B2* | 2/2019 | Alford | G01N 27/90 |
| 2016/0016461 A1* | 1/2016 | de Vries | B60K 11/08 |
| | | | 74/89.16 |
| 2017/0219533 A1 | 8/2017 | Alford et al. | |
| 2019/0022877 A1* | 1/2019 | Akin | B62D 57/02 |
| 2019/0126486 A1* | 5/2019 | Hiraguri | G01B 5/14 |

OTHER PUBLICATIONS

International Search Report (PCT/ISA/210) with translation and Written Opinion (PCT/ISA/237) mailed on Mar. 10, 2020, by the Japan Patent Office as the International Searching Authority for International Application No. PCT/JP2020/001275.
Office Action dated May 12, 2023, issued in the corresponding Canadian Patent Application No. 3,153,834, 5 pages.
Office Action dated Jan. 17, 2025, issued in the corresponding Chinese Patent Application No. 202080091152.0, 25 pages including 14 pages of English Translation.

* cited by examiner

INSPECTION DEVICE FOR ROTARY ELECTRIC MACHINE AND INSPECTION SYSTEM FOR ROTARY ELECTRIC MACHINE

TECHNICAL FIELD

The present disclosure relates to an inspection device for a rotary electric machine and an inspection system for a rotary electric machine.

BACKGROUND ART

A rotor wedge for holding a copper winding is inserted in a rotor of a large-sized rotary electric machine used as an electric generator. A defect such as a crack at a surface of the rotor wedge may cause a failure in the rotary electric machine. In general, the rotor needs to be removed from the rotary electric machine in order to inspect the rotor wedge for the defect. In a case where the rotor is removed from the rotary electric machine and inspected, many problems arise. For example, the rotary electric machine is stopped for a long time period, or the rotor or a stator may be damaged when the rotor is dismounted or mounted.

A method in which, in a state where the rotor is mounted to the rotary electric machine, an inspection device is inserted in a gap between the rotor and the stator and the inspection device is operated by a remote device to inspect the rotor wedge for a defect, is disclosed as a method for addressing these problems. The inspection device includes an extending/contracting mechanism having an inspection sensor mounted at the end thereof. The inspection device is inserted into the rotary electric machine in a state where the extending/contracting mechanism is contracted. When the inspection device has reached an inspection position, the extending/contracting mechanism of the inspection device is extended to bring the inspection sensor into close contact with the rotor (for example, see Patent Document 1).

CITATION LIST

Patent Document

Patent Document 1: Japanese Laid-Open Patent Publication No. 2017-138315

SUMMARY OF THE INVENTION

Problems to be Solved by the Invention

In general, a rotor fastening ring is disposed at the end portion of the rotor. In general, the outer diameter of the rotor fastening ring is set to be greater than the rotor outer diameter in the rotor. Therefore, a gap between the rotor fastening ring and the stator at the end portion of the rotary electric machine is narrower than a gap between the rotor and the stator inside the rotary electric machine.

A conventional inspection device stops in a state where an extending/contracting mechanism is extended in a case where a failure occurs in a drive unit for the extending/contracting mechanism in a state where the extending/contracting mechanism is extended after the inspection device has been inserted into the rotary electric machine. Therefore, the inspection device cannot pass through the gap between the rotor fastening ring and the stator. Accordingly, the rotor needs to be removed from the rotary electric machine in order to remove the inspection device without causing damage to the rotary electric machine and the inspection device.

The present disclosure has been made in order to solve the aforementioned problems, and an inspection device of the present disclosure can be removed from a rotary electric machine without removing a rotor even in a case where a failure occurs in a drive unit for an extending/contracting mechanism in a state where the inspection device has been inserted in the rotary electric machine.

Solution to the Problems

An inspection device of the present disclosure includes: a base; a linear motion mechanism mounted to the base for performing linear motion; a link mechanism which has a driving link, and a driven link that is connected to the base, and which extends/contracts, by the linear motion performed by the linear motion mechanism, in a direction intersecting a direction of the linear motion; a connection mechanism for connecting between the driving link of the link mechanism and the linear motion mechanism; and a sensor mounted to the link mechanism. The connection mechanism has a link connection portion connected to the driving link, and an interlocking portion that is connected to the link connection portion and that moves in conjunction with the linear motion performed by the linear motion mechanism. When a force higher than or equal to a predetermined force is applied to the link mechanism, the link connection portion and the interlocking portion are disconnected, and the link connection portion is separated from the interlocking portion so as to contract the link mechanism.

Effect of the Invention

The inspection device of the present disclosure includes the connection mechanism in which, when a force higher than or equal to a predetermined force is applied to the link mechanism, the link connection portion and the interlocking portion are disconnected and the link connection portion is separated from the interlocking portion so as to contract the link mechanism. Therefore, even in a case where the linear motion mechanism does not operate normally, the link mechanism can be contracted. As a result, even in a case where a failure occurs in the drive unit for the extending/contracting mechanism in the inspection device after the inspection device has been inserted in a rotary electric machine, the inspection device can be removed without removing the rotor from the rotary electric machine.

DESCRIPTION OF EMBODIMENTS

Figure 1:
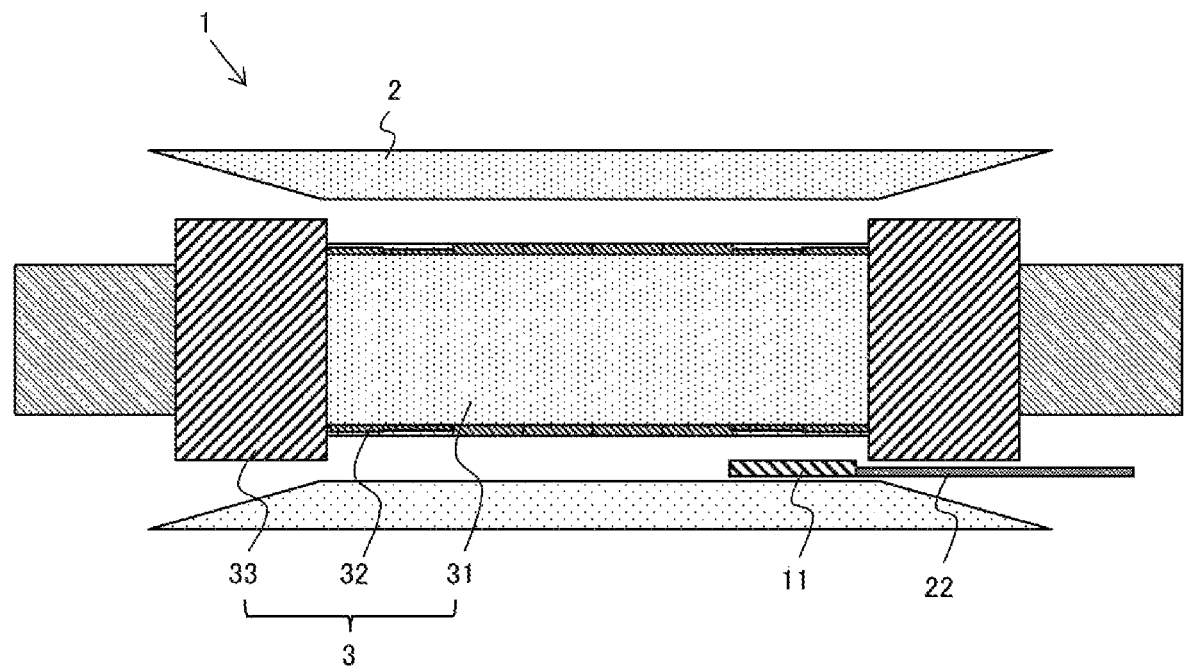
FIG. 1 is a schematic diagram illustrating a cross-section of a rotary electric machine according to embodiment 1.

An inspection device for a rotary electric machine and an inspection system for a rotary electric machine according to an embodiment for implementing the present disclosure will be described below in detail with reference to the drawings. The same or corresponding components throughout the drawings are denoted by the same reference characters.

Embodiment 1

FIG. 1 is a schematic diagram illustrating a cross-section of a rotary electric machine to be inspected by an inspection device according to embodiment 1. The rotary electric machine in FIG. 1 is a large-sized rotary electric machine used as, for example, an electric generator. A rotary electric machine 1 is composed of a stator 2 and a rotor 3. The stator 2 has a cylindrical shape. The rotor 3 has a columnar shape, is disposed in the stator 2, and is rotatable relative to the stator 2. The rotor 3 includes a rotor shaft 31, a rotor wedge 32, and a rotor fastening ring 33. The rotor wedge 32 is disposed on the surface of the rotor shaft 31, and has a function of holding a winding of the rotor 3. The entire surface of the rotor wedge 32 may not necessarily be disposed at the same position as the surface of the rotor shaft 31, and some surfaces of the rotor wedge 32 may be disposed at a deeper side position relative to the inner diameter than the surface of the rotor shaft 31. An outer diameter of the rotor fastening ring 33 is set to be greater than an outer diameter of the rotor shaft 31. Therefore, a gap between the stator 2 and the rotor 3 at the end portion of the rotary electric machine 1 is narrower than a gap between the stator 2 and the rotor 3 inside the rotary electric machine 1. For example, the gap between the stator 2 and the rotor 3 at the end portion at which the rotor fastening ring 33 is disposed is about 2 cm. An inspection device 11 of the present embodiment is inserted into the gap between the stator 2 and the rotor 3 by using an insertion bar 22. The inspection device 11 is fixed to the tip of the insertion bar 22.

Figure 2:
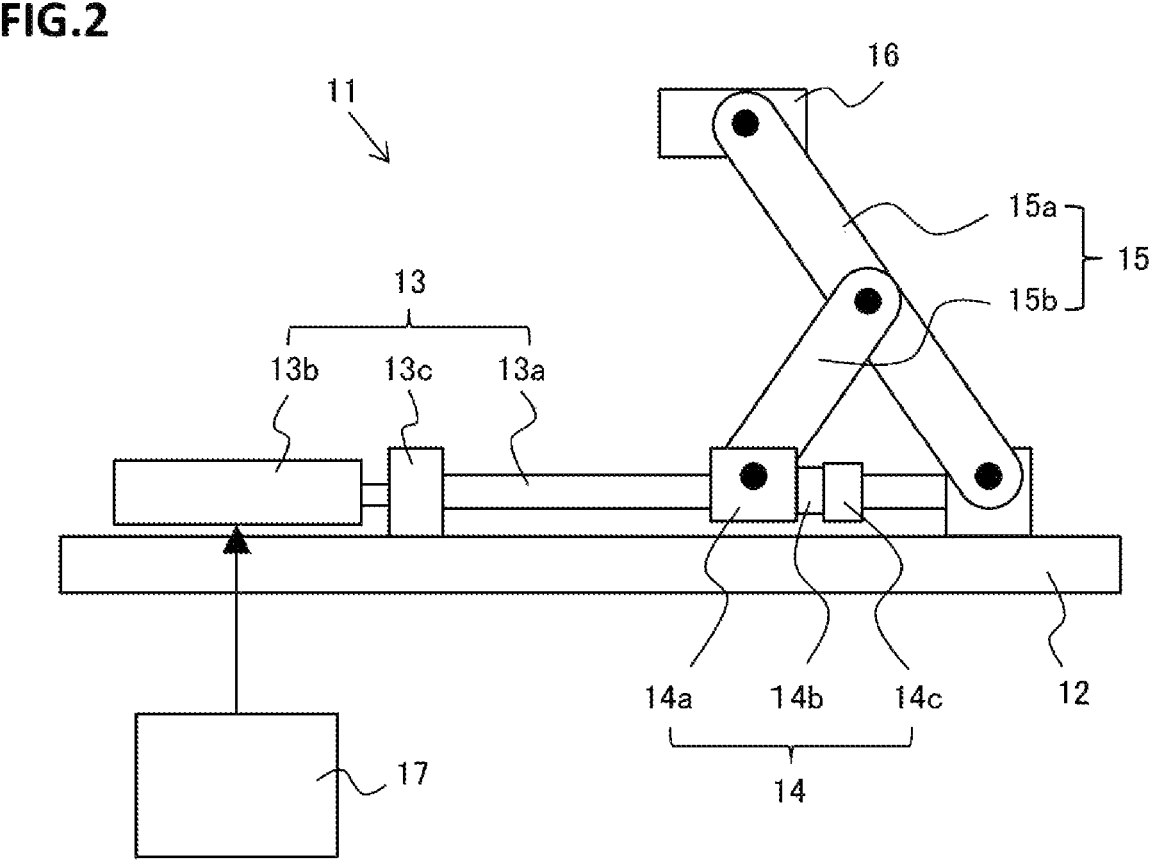
FIG. 2 is a schematic diagram illustrating an inspection device according to embodiment 1.

FIG. 2 is a schematic diagram illustrating the inspection device according to the present embodiment. The inspection device 11 is composed of an elongated base 12, a linear motion mechanism 13, a connection mechanism 14, a link mechanism 15, and an inspection sensor 16. The base 12 is, for example, a metal member to which the linear motion mechanism 13, the link mechanism 15, and the like are mounted.

The linear motion mechanism 13 is, for example, a ball screw mechanism, and is composed of a ball screw 13a, a motor 13b, and a bearing 13c. The connection mechanism 14 is connected to the ball screw 13a. The linear motion mechanism 13 rotates the motor 13b in response to a signal from an external remote device 17, and linearly moves the connection mechanism 14 through the ball screw 13a.

The connection mechanism 14 is composed of a link connection portion 14a, a magnet 14b, and a ball nut 14c. The ball nut 14c is linearly moved by rotation of the ball screw 13a of the linear motion mechanism 13. That is, the ball nut 14c is an interlocking portion that moves in conjunction with the linear motion performed by the linear motion mechanism 13 at the connection mechanism 14. The magnet 14b is fixed to the ball nut 14c. The link connection portion 14a is formed as a metal magnetic body, and is connected to the ball nut 14c by a magnetic attraction force of the magnet 14b. The link connection portion 14a may be structured to incorporate a magnet other than the magnet 14b. The link connection portion 14a does not move in direct conjunction with the linear motion performed through the ball screw 13a by the linear motion mechanism 13, and is retained with a certain degree of freedom in the direction of the linear motion performed by the linear motion mechanism 13. That is, the link connection portion 14a is a separate portion relative to the linear motion mechanism 13 at the connection mechanism 14. For example, the link connection portion 14a is supported by a not-illustrated linear motion guide disposed parallel to the direction of the linear motion performed by the linear motion mechanism 13. Alternatively, the link connection portion 14a has a through hole through which the ball screw 13a penetrates, and the link connection portion 14a is supported by the ball screw 13a via the through hole. Therefore, in a case where no external force is applied, the link connection portion 14a and the ball nut 14c of the connection mechanism 14 are connected by a magnetic attraction force of the magnet 14b. Then, the connection mechanism 14 moves in conjunction with the linear motion performed by the linear motion mechanism 13, and the connection mechanism 14 and the linear motion mechanism 13 integrally move. From the viewpoint that the link connection portion 14a and the ball nut 14c need to be connected by a magnetic attraction force, the magnet 14b may be fixed to the link connection portion 14a. In this case, the ball nut 14c needs to be formed as a magnetic body or needs to incorporate another magnet.

A maximum connecting force between the link connection portion 14a and the ball nut 14c by the magnetic attraction force is set to be higher than a force applied to a force application point in the link mechanism 15 for allowing the inspection sensor 16 to have a pressing force as described below, and lower than a force applied to a force application point in the link mechanism 15 for contracting the link mechanism 15 in an emergency operation.

The link mechanism 15 is composed of a first link 15a and a second link 15b. The first link 15a and the second link 15b each include joints at both ends. One of the joints of the first link 15a is connected to the base 12. The inspection sensor 16 is connected to the other of the joints of the first link 15a. One of the joints of the second link 15b is connected to the link connection portion 14a. The other of the joints of the second link 15b is connected to the first link 15a in a rotatable manner. In the link mechanism 15 having such a structure, the first link 15a acts as a driven link and the second link 15b acts as a driving link.

As illustrated in FIG. 2, the link mechanism 15 transforms the left-rightward movement of the connection mechanism 14 according to the linear motion performed by the linear motion mechanism 13 to the up-downward movement of the inspection sensor 16. Hereinafter, an operation of the link mechanism 15 for moving the inspection sensor 16 in a direction intersecting a direction of the linear motion performed by the linear motion mechanism 13, is referred to as an extending/contracting operation of the link mechanism 15. An operation of the link mechanism 15 for moving the inspection sensor 16 away from the base 12 is referred to as an extending operation of the link mechanism 15, and an operation of the link mechanism 15 for moving the inspection sensor 16 close to the base 12 is referred to as a contracting operation of the link mechanism 15.

A stroke of the linear motion mechanism 13 needs to be set such that the link mechanism 15 can be most contracted to be minimized. That is, the stroke of the linear motion mechanism 13 is set as a length greater than or equal to the total of a distance between paired portions of the first link 15a and a distance between paired portions of the second link 15b. The paired portions refer to portions at which two links as a pair are joined with a degree of freedom for relative movement in the link mechanism. Specifically, in FIG. 2, the paired portions of the first link 15a are a joint between the first link 15a and the base 12 and a joint between the first link 15a and the second link 15b. The paired portions of the second link 15b are a joint between the second link 15b and the link connection portion 14a and a joint between the second link 15b and the first link 15a.

Next, a normal operation of the inspection device 11 and an emergency operation therefor will be sequentially described. For simplifying the description, influence of gravity is not referred to in the following description.

Figure 3:
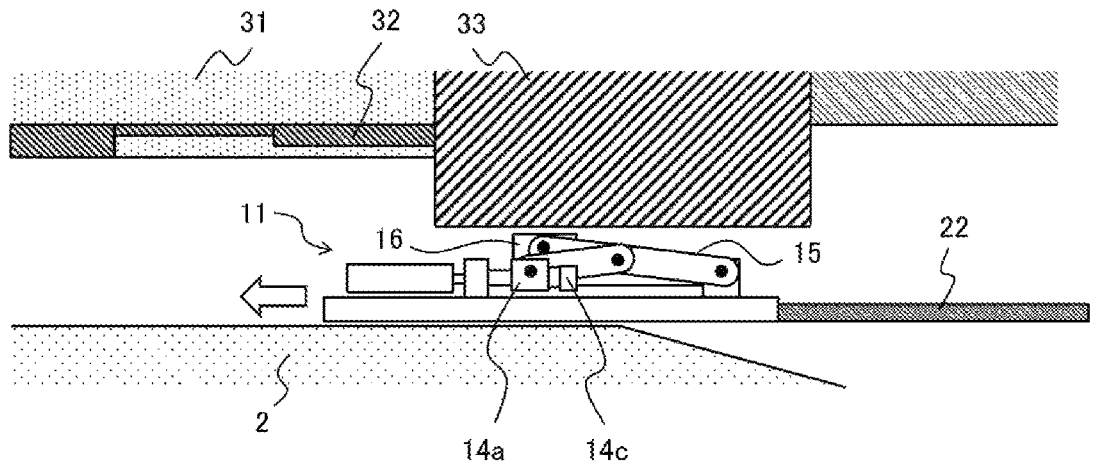
FIG. 3 is a schematic diagram illustrating a normal operation of the inspection device according to embodiment 1.
Figure 4:
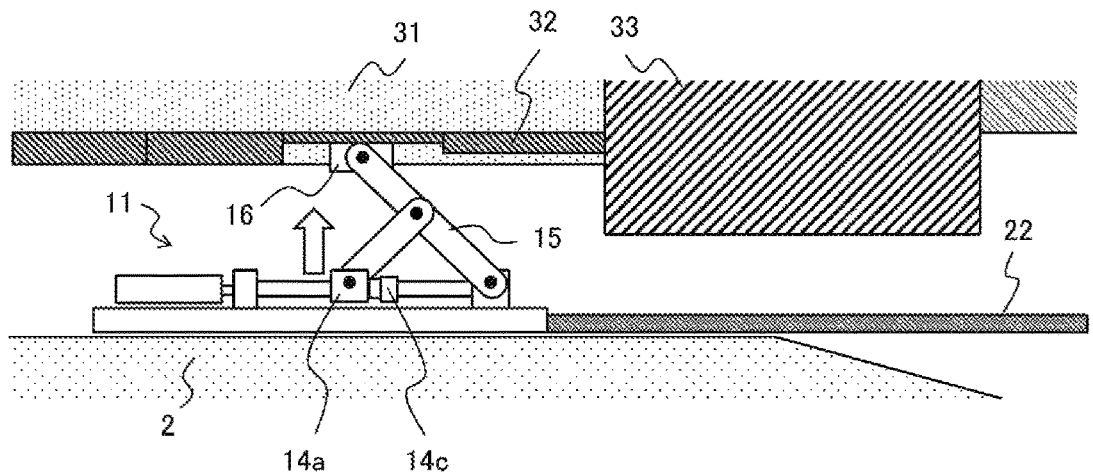
FIG. 4 is a schematic diagram illustrating the normal operation of the inspection device according to embodiment 1.
Figure 5:
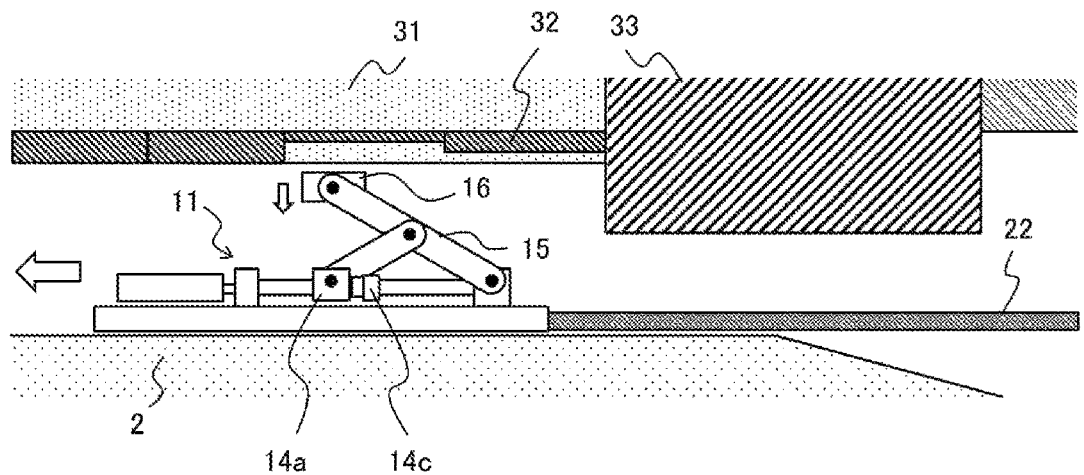
FIG. 5 is a schematic diagram illustrating the normal operation of the inspection device according to embodiment 1.

Firstly, the normal operation of the inspection device 11 will be described. FIG. 3 to FIG. 5 are each a schematic diagram illustrating the normal operation of the inspection device 11 according to the present embodiment. FIG. 3 is a schematic diagram illustrating insertion of the inspection device 11 into the rotary electric machine. As illustrated in FIG. 3, when the inspection device is inserted into the rotary electric machine, the link mechanism 15 is in the most contracted state so as to allow the inspection device 11 to pass through the narrowest gap between the stator 2 and the rotor fastening ring 33. At this time, no external force is applied between the link connection portion 14a and the ball nut 14c of the connection mechanism 14 in the compression direction and the separating direction. Therefore, the link connection portion 14a and the ball nut 14c are connected to each other by a magnetic attraction force of the magnet 14b. As a result, the link mechanism 15 and the linear motion mechanism 13 are connected at the connection mechanism 14.

FIG. 4 is a schematic diagram illustrating inspection of the rotor wedge 32 by the inspection device 11. As illustrated in FIG. 4, when the rotary electric machine is inspected, the link mechanism 15 extends such that the inspection device 11 presses the inspection sensor 16 against the rotor wedge 32. At this time, an external force is applied between the link connection portion 14a and the ball nut 14c of the connection mechanism 14 in the separating direction. The external force is a force for allowing the inspection sensor 16 to have a pressing force for the inspection. As described above, since the magnetic attraction force of the magnet 14b is higher than the external force, connection between the link connection portion 14a and the ball nut 14c by the magnetic attraction force of the magnet 14b is maintained.

FIG. 5 is a schematic diagram illustrating movement of the inspection device 11 to a subsequent inspection position. As illustrated in FIG. 5, the inspection device 11 contracts the link mechanism 15 to an intermediate position so as to separate the inspection sensor 16 from the rotor wedge 32. At this time, no external force is applied between the link connection portion 14a and the ball nut 14c of the connection mechanism 14 in the compression direction and the separating direction, and the link connection portion 14a and the ball nut 14c are thus connected by the magnetic attraction force of the magnet 14b. As a result, the link mechanism 15 and the linear motion mechanism 13 are connected at the connection mechanism 14. The inspection device 11 is moved to a subsequent inspection position by the insertion bar 22.

Thus, the operations in FIG. 4 to FIG. 5 are repeated, whereby the inspection device 11 can inspect the rotary electric machine. During the normal operation of the inspection device 11, in the connection mechanism 14, the link connection portion 14a, the magnet 14b, and the ball nut 14c are integrally moved.

Figure 6:
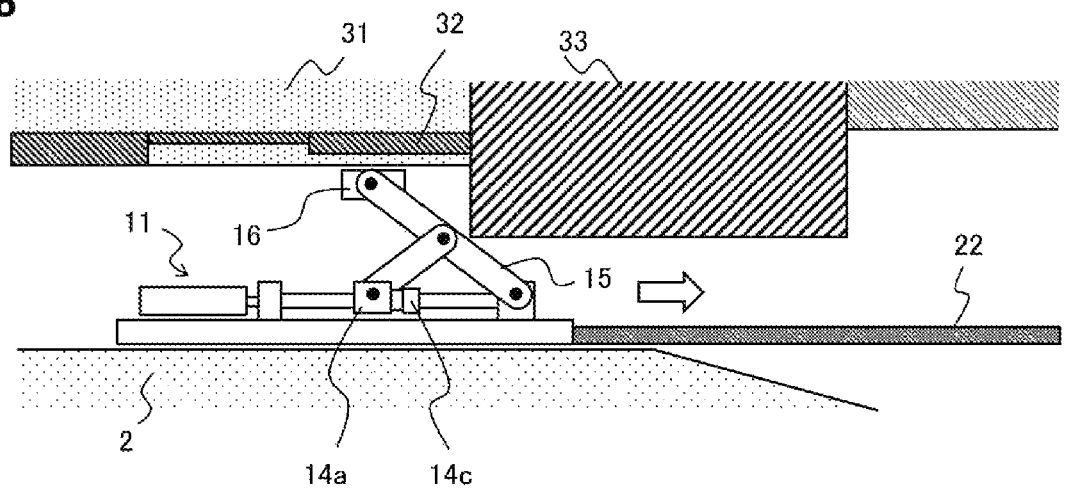
FIG. 6 is a schematic diagram illustrating an emergency operation for the inspection device according to embodiment 1.
Figure 7:
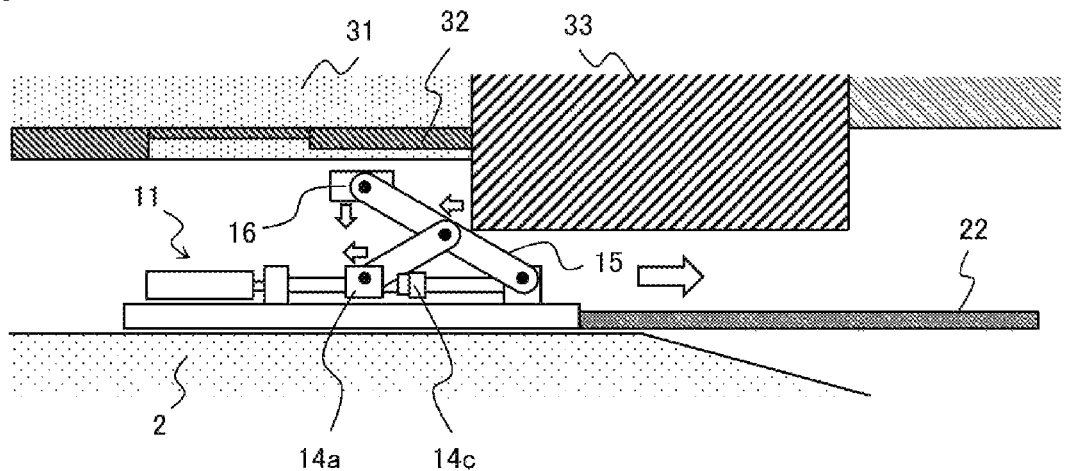
FIG. 7 is a schematic diagram illustrating the emergency operation for the inspection device according to embodiment 1.
Figure 8:
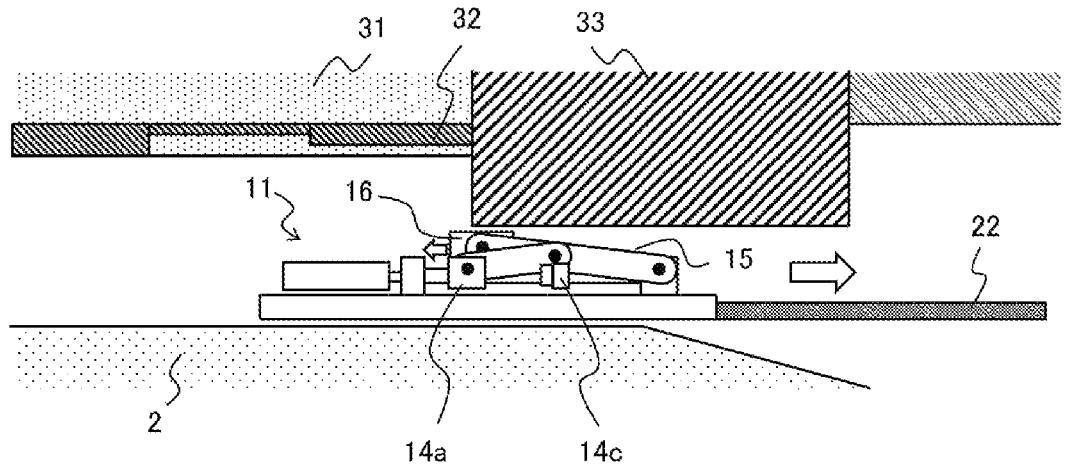
FIG. 8 is a schematic diagram illustrating the emergency operation for the inspection device according to embodiment 1.

Next, an emergency operation for the inspection device 11 will be described. FIG. 6 to FIG. 8 are each a schematic diagram illustrating the emergency operation for the inspection device 11 according to the present embodiment. The emergency operation represents an operation of removing the inspection device 11 from the rotary electric machine in a case where abnormality occurs in the inspection device when the inspection device 11 is inspecting the rotor wedge 32. The abnormality in the inspection device represents a state where the linear motion mechanism 13 as a drive unit for the link mechanism 15 does not operate normally and the extending/contracting operation of the link mechanism 15 cannot be controlled. For example, the linear motion mechanism 13 cannot operate normally due to, for example, a transmission path of a signal from the remote device 17 being disconnected or power supply to the linear motion mechanism 13 being stopped. A case where abnormality occurs in the inspection device 11 in the state illustrated in FIG. 5 is assumed. In a case where abnormality occurs in the inspection device 11 in the state illustrated in FIG. 5, the link mechanism 15 has been extended to the intermediate position. The link connection portion 14a and the ball nut 14c of the connection mechanism 14 are connected by the magnetic attraction force of the magnet 14b.

FIG. 6 is a schematic diagram illustrating removal of the inspection device 11 with use of the insertion bar 22. As illustrated in FIG. 6, in a case where the inspection device 11 is moved in the removal direction, since the link mechanism 15 of the inspection device 11 has been extended, the link mechanism 15 comes into contact with the rotor fastening ring 33. In a case where a force is further applied in this state to the inspection device 11 in the removal direction by using the insertion bar 22, a force in the direction opposite to the removal direction acts on the link mechanism 15. The force acting on the link mechanism 15 acts so as to contract the link mechanism 15. At this time, a force in the direction opposite to the removal direction acts on the link connection portion 14a through the link mechanism 15. When the force acting on the link connection portion 14a becomes higher than the magnetic attraction force by which the link connection portion 14a and the ball nut 14c are connected, the link connection portion 14a separates from the ball nut 14c. That is, the maximum connecting force between the link connection portion 14a and the ball nut 14c is a predetermined force, and, when a force higher than the predetermined force acts on the link mechanism 15, the link connection portion 14a and the ball nut 14c are disconnected. The link connection portion 14a has a certain degree of freedom in the linear motion direction, and is thus separated from the ball nut 14c along the linear motion direction. FIG. 7 illustrates a state where the link connection portion 14a is separated from the ball nut 14c. The link connection portion 14a is moved so as to be separated from the ball nut 14c, whereby the link mechanism 15 contracts. As a result, the position of the inspection sensor 16 is lowered, and the link mechanism 15 contracts so as to allow the inspection device 11 to pass through a gap between the rotor fastening ring 33 and the stator 2. FIG. 8 illustrates a state where the inspection device 11 passes through the gap between the rotor fastening ring 33 and the stator 2. Thus, even in a case where abnormality occurs in the inspection device 11, the inspection device 11 can be removed from the rotary electric machine.

For the emergency operation, a case where abnormality occurs in the inspection device 11 in the state illustrated in FIG. 5 has been described. In a case where abnormality occurs in the state illustrated in FIG. 4, when the inspection device 11 is moved in the removal direction by using the insertion bar 22, the inspection sensor 16 comes into contact with a stepped portion of the rotor wedge 32. Also in this case, in a case where a force is further applied to the inspection device 11 in the removal direction by using the insertion bar 22, a force in the direction opposite to the removal direction acts on the link mechanism 15 through the inspection sensor 16. The link connection portion 14a is separated from the ball nut 14c by this force, whereby the link mechanism 15 contracts. As a result, the inspection device 11 can be removed from the rotary electric machine.

In the inspection device having such a structure, in a case where an overload acts on the connection mechanism, the link connection portion and the ball nut are disconnected and the link connection portion is separated from the ball nut. Therefore, even in a case where the linear motion mechanism as the drive unit for an operation of extending/contracting the link mechanism does not operate normally, the link mechanism contracts. As a result, the inspection device can be removed without removing the rotor from the rotary electric machine and causing damage to the rotary electric machine and the inspection device.

The overload acting on the connection mechanism is also generated by, for example, a reaction force of an excessive pressing force of the inspection sensor against the rotor wedge, in addition to a reaction force generated when the link mechanism comes into contact with the rotor fastening ring or a reaction force generated when the inspection sensor comes into contact with a stepped portion of the rotor wedge. Also in this case, the link connection portion is separated from the ball nut and moves so as to contract the link mechanism, whereby the pressing force of the inspection sensor is lowered. As a result, damage to the rotor wedge due to an excessive pressing force of the inspection sensor can also be prevented.

A connection force between the link connection portion and the ball nut is obtained by the magnetic attraction force of the magnet. Therefore, if the link connection portion and the ball nut are disconnected and the link connection portion and the ball nut are separated from each other in the rotary electric machine, the linear motion mechanism can move the ball nut close to the link connection portion separated therefrom and connect again the link connection portion and the ball nut to each other by using the magnetic attraction force of the magnet.

Figure 9:
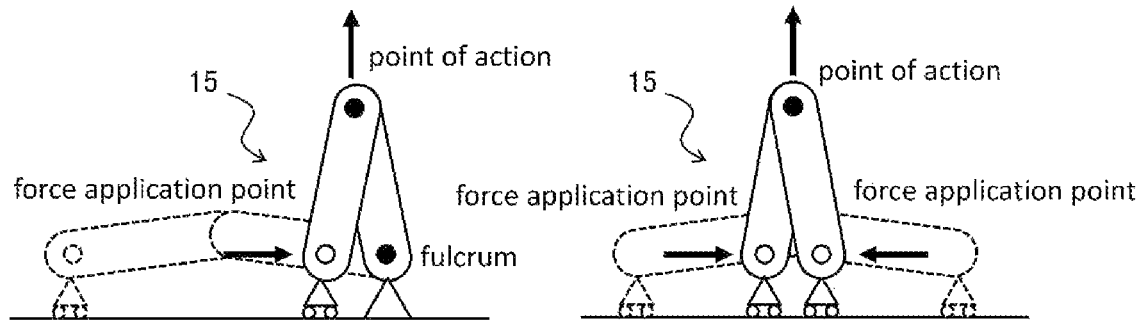
FIG. 9 is a schematic diagram illustrating a structure of a link mechanism according to embodiment 1.

The structure of the link mechanism is not limited to the structure illustrated in FIG. 2, and the link mechanism may have another structure as long as the operation at all the paired portions except for the force application point and the fulcrum of the link mechanism has a movement component in a direction perpendicular to or the same direction as a direction in which a force acts on the force application point. The structure in which the link mechanism has two force application points can be a structure that satisfies the above-described condition on the assumption that one of the force application points is regarded as the fulcrum and a force is applied only to the other of the force application points. The link mechanism satisfying these conditions is, for example, the link mechanism 15 illustrated in FIG. 9. The link mechanism 15 having one force application point is illustrated on the left side in FIG. 9 and the link mechanism 15 having two force application points is illustrated on the right side in FIG. 9. As long as the above-described condition is satisfied, a link mechanism in which a plurality of or various types of link mechanisms are combined can be used as the link mechanism of the inspection device.

In the present embodiment, the ball screw mechanism is used as the linear motion mechanism. Another mechanism such as a linear motor instead of the ball screw mechanism may be used as the linear motion mechanism.

In the present embodiment, the link connection portion and the ball nut are connected by the magnetic attraction force of the magnet. However, the present disclosure is not limited thereto. For example, the link connection portion and the ball nut may be fitted to each other by using an elastically deformable member and thus connected. In this case, the maximum connecting force by the fitting is set to be higher than a force applied to the force application point in the link mechanism for allowing the inspection sensor to have a pressing force for the inspection, and lower than a force applied to the force application point in the link mechanism for contracting the link mechanism in the emergency operation.

Embodiment 2

Figure 10:
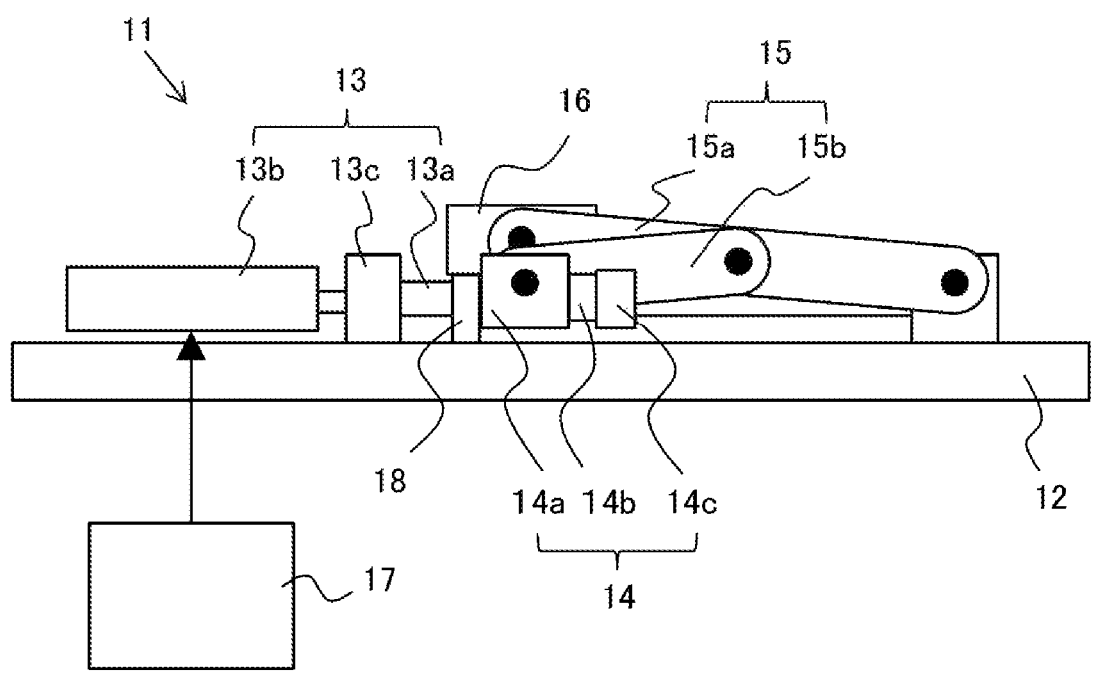
FIG. 10 is a schematic diagram illustrating an inspection device according to embodiment 2.

FIG. 10 is a schematic diagram illustrating an inspection device according to embodiment 2. Although the inspection device 11 of the present embodiment is similar to the inspection device of embodiment 1, the base 12 has a holding magnet 18. The holding magnet 18 is disposed so as to come into contact with the connection mechanism 14 when the link mechanism 15 is in the most contracted state. FIG. 10 illustrates the inspection device 11 of the present embodiment in the most contracted state. The holding magnet 18 holds the link connection portion 14a of the connection mechanism 14 by a magnetic attraction force. The magnetic attraction force of the holding magnet 18 is set to be lower than the magnetic attraction force of the magnet 14b acting between the link connection portion 14a and the ball nut 14c.

In the inspection device having such a structure, when the link connection portion 14a and the ball nut 14c are disconnected in the emergency operation, the holding magnet 18 attracts the link connection portion 14a by the magnetic attraction force to retain the link mechanism 15 in the most contracted state. Therefore, in the emergency operation, the link mechanism 15 can be prevented from unnecessarily extending. As a result, unnecessary contact between the rotor fastening ring 33, and the link mechanism 15 or the inspection sensor 16 can be prevented when the inspection device 11 is removed.

The magnetic attraction force acting between the holding magnet 18 and the link connection portion 14a is set to be lower than the magnetic attraction force of the magnet 14b acting between the link connection portion 14a and the ball nut 14c. Therefore, the magnetic attraction force of the holding magnet 18 does not exert an influence on the extending/contracting operation of the link mechanism 15 according to the linear motion performed by the linear motion mechanism 13 in the normal operation.

Furthermore, although, in FIG. 10, the holding magnet 18 is disposed so as to be separated from the bearing 13c of the linear motion mechanism 13, the holding magnet 18 may be disposed so as to be in contact with the bearing 13c.

Embodiment 3

Figure 11:
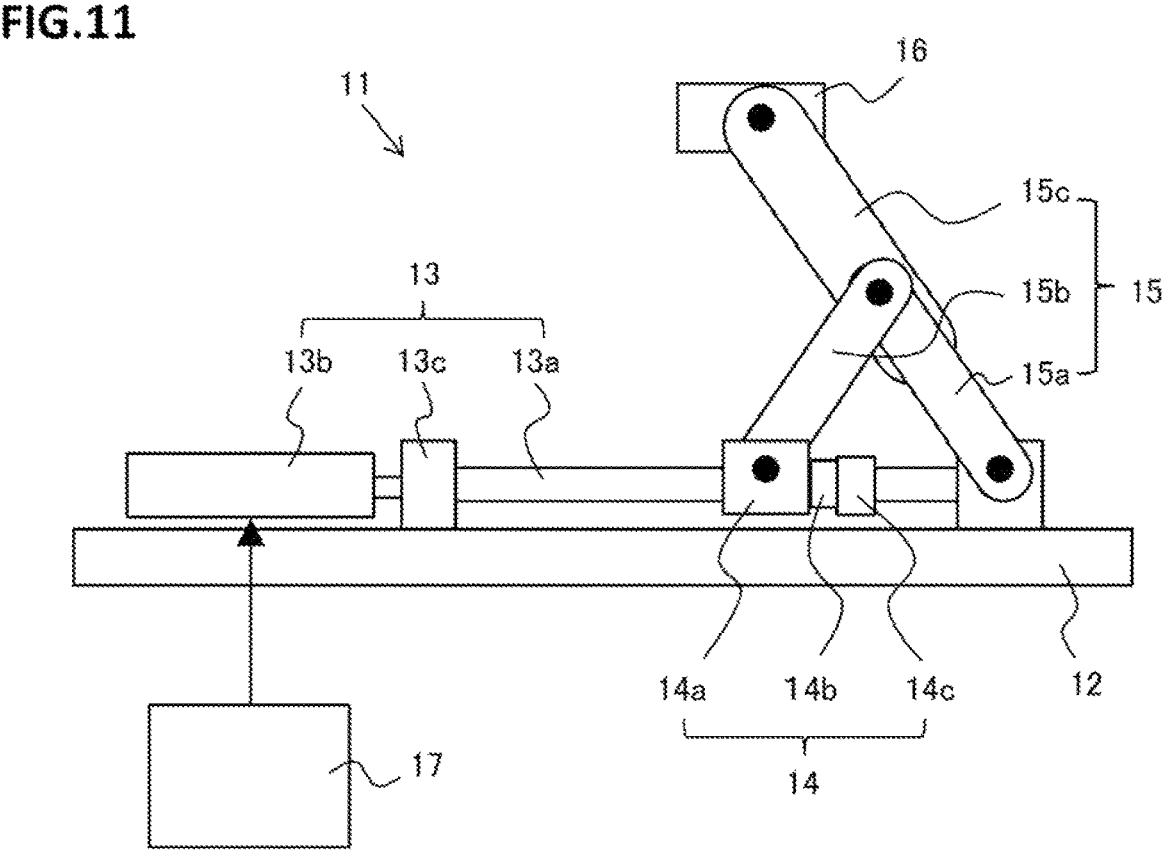
FIG. 11 is a schematic diagram illustrating an inspection device according to embodiment 3.

FIG. 11 is a schematic diagram illustrating an inspection device according to embodiment 3. Although the inspection device 11 of the present embodiment is similar to the inspection device of embodiment 1, the structure of the link mechanism 15 is different. As illustrated in FIG. 11, the link mechanism 15 of the present embodiment is composed of the first link 15a, the second link 15b, and an expansion link 15c. In the link mechanism 15 having such a structure, the first link 15a acts as a driven link, the second link 15b acts as a driving link, and the first link 15a and the second link 15b form a main link. The first link 15a, the second link 15b, and the expansion link 15c each include joints at both ends. One of the joints of the first link 15a is connected to the base 12. One of the joints of the expansion link 15c is connected to the other of the joints of the first link 15a. The inspection sensor 16 is connected to the other of the joints of the expansion link 15c. One of the joints of the second link 15b is connected to the link connection portion 14a. The other of the joints of the second link 15b is connected to the other of the joints of the first link 15a in a rotatable manner. The length of the expansion link 15c is greater than the length of each of the first link 15a and the second link 15b. In FIG. 11, the width of the expansion link 15c is shown to be greater than the width of each of the first link 15a and the second link 15b for facilitating the discrimination in the drawings. There is no problem also when the width of the expansion link 15c is equal to the width of each of the first link 15a and the second link 15b.

Figure 12:
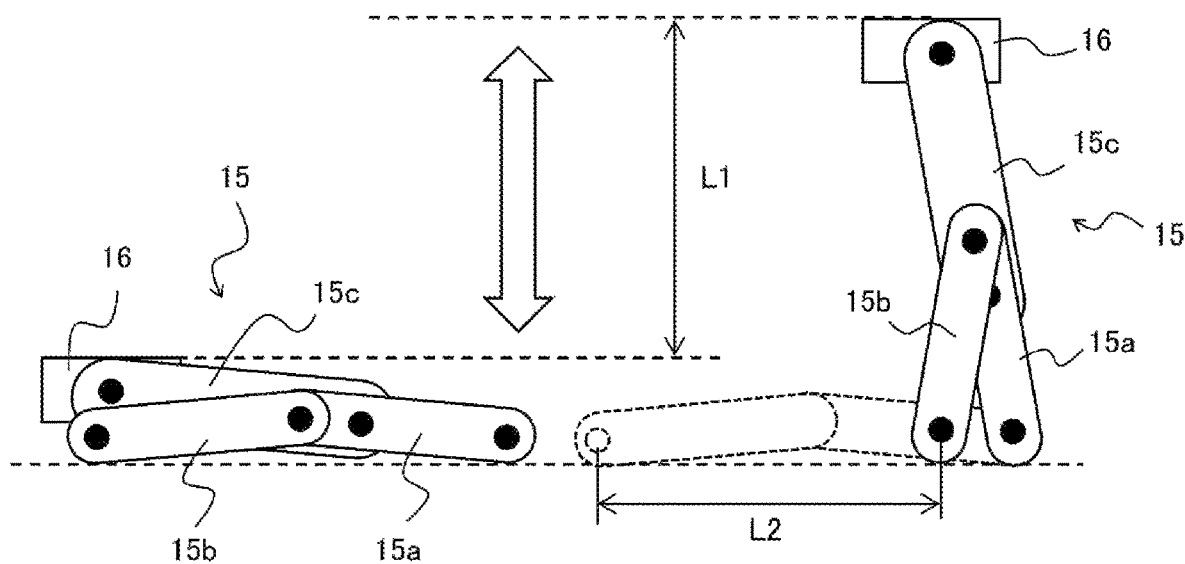
FIG. 12 is a schematic diagram illustrating an operation of a link mechanism according to embodiment 3.
Figure 13:
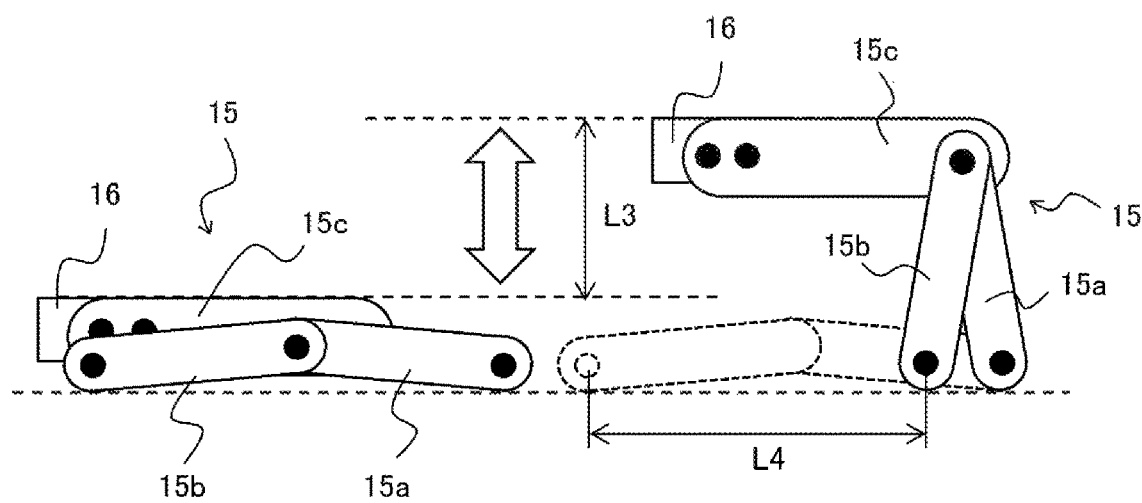
FIG. 13 is a schematic diagram illustrating an operation of the link mechanism according to embodiment 3.

FIG. 12 and FIG. 13 are each a schematic diagram illustrating an operation of the link mechanism according to the present embodiment. In FIG. 12 and FIG. 13, a state where the link mechanism 15 is contracted is illustrated on the left side, and a state where the link mechanism 15 is extended is illustrated on the right side. FIG. 12 illustrates an operation of the link mechanism 15 in which the expansion link 15c is fixed to the first link 15a. FIG. 13 illustrates an operation of the link mechanism 15 in which the expansion link 15c is fixed to the inspection sensor 16. In the link mechanism illustrated in each of FIG. 12 and FIG. 13, a distance between paired portions is equal among the first link 15a, the second link 15b, and the expansion link 15c.

As illustrated in FIG. 12, in the link mechanism 15 in which the expansion link 15c is fixed to the first link 15a, since a distance between the paired portions is equal among the links, a moving distance L1 of the inspection sensor 16 in a direction orthogonal to a direction of the motion performed by the linear motion mechanism 13 is almost equal to a distance L2 of the motion performed by the linear motion mechanism 13. Meanwhile, as illustrated in FIG. 13, in the link mechanism 15 in which the expansion link 15c is fixed to the inspection sensor 16, since a distance between the paired portions is equal among the links, a moving distance L3 of the inspection sensor 16 in a direction orthogonal to a direction of the motion performed by the linear motion mechanism 13 is about ½ of a distance L4 of the motion performed by the linear motion mechanism 13.

In general, a thrust force through the link mechanism is known to be inversely proportional to a ratio between a moving distance of the force application point and a moving distance of a point of action. In the link mechanism 15 illustrated in FIG. 12 and FIG. 13, in a case where a thrust force generated at the linear motion mechanism 13 is equal, the closer the link mechanism 15 is to the most contracted state, the lower a pressing force of the inspection sensor 16 is. In order to use the inspection device in the rotary electric machines having various specifications, the pressing force of the inspection sensor 16 needs to be set with reference to the rotary electric machine having the specifications in which a distance from the inner circumferential surface of the stator to the rotor wedge is shortest. In the inspection device of the present embodiment, by selecting a component to which the expansion link 15c is to be fixed, a moving distance of the inspection sensor 16 can be changed relative to a distance of the motion performed by the linear motion mechanism 13. For example, as illustrated in FIG. 13, by adopting the link mechanism in which the expansion link is fixed to the inspection sensor, the minimum thrust force required for the linear motion mechanism can be reduced. As a result, the size of the linear motion mechanism can be reduced and the thickness of the inspection device can be reduced.

Figure 14:
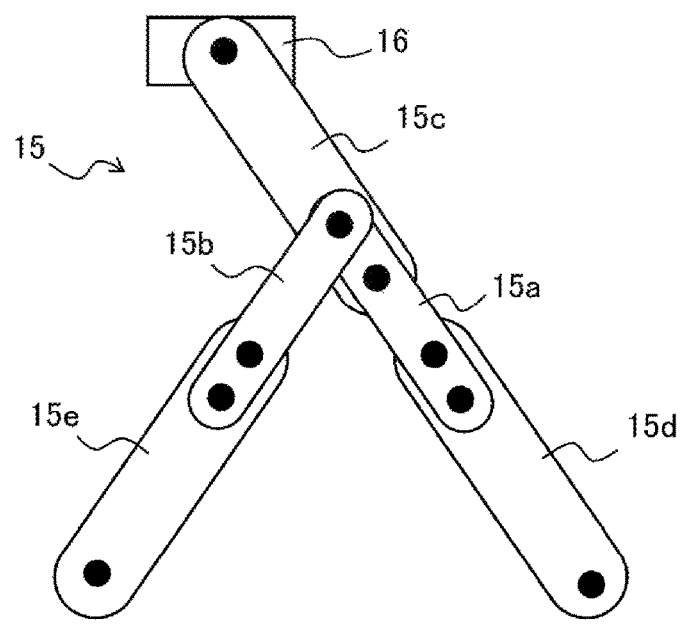
FIG. 14 is a schematic diagram illustrating the link mechanism according to embodiment 3.

FIG. 14 is a schematic diagram illustrating another link mechanism of the present embodiment. The link mechanism 15 illustrated in FIG. 14 is composed of the first link 15a, the second link 15b, and three expansion links 15c, 15d, and 15e. In the link mechanism 15 having such a structure, the first link 15a acts as a driven link, the second link 15b acts as a driving link, and the first link 15a and the second link 15b form a main link. The first link 15a, the second link 15b, and the three expansion links 15c, 15d, and 15e each have joints at both ends. One of the joints of the first link 15a is connected to one of the joints of the expansion link 15d. The other of the joints of the expansion link 15d is connected to the base. The other of the joints of the first link 15a is connected to one of the joints of the expansion link 15c. The inspection sensor 16 is connected to the other of the joints of the expansion link 15c. One of the joints of the second link 15b is connected to one of the joints of the expansion link 15e. The other of the joints of the expansion link 15e is connected to the link connection portion. The other of the joints of the second link 15b is connected to the other of the joints of the first link 15a in a rotatable manner. The length of each of the expansion links 15c, 15d, and 15e is greater than the length of each of the first link 15a and the second link 15b. In FIG. 14, the width of each of the expansion links 15c, 15d, and 15e is shown to be greater than the width of each of the first link 15a and the second link 15b for facilitating the discrimination in the drawings. There is no problem also when the width of each of the expansion links 15c, 15d, and 15e is equal to the width of each of the first link 15a and the second link 15b.

Figure 15:
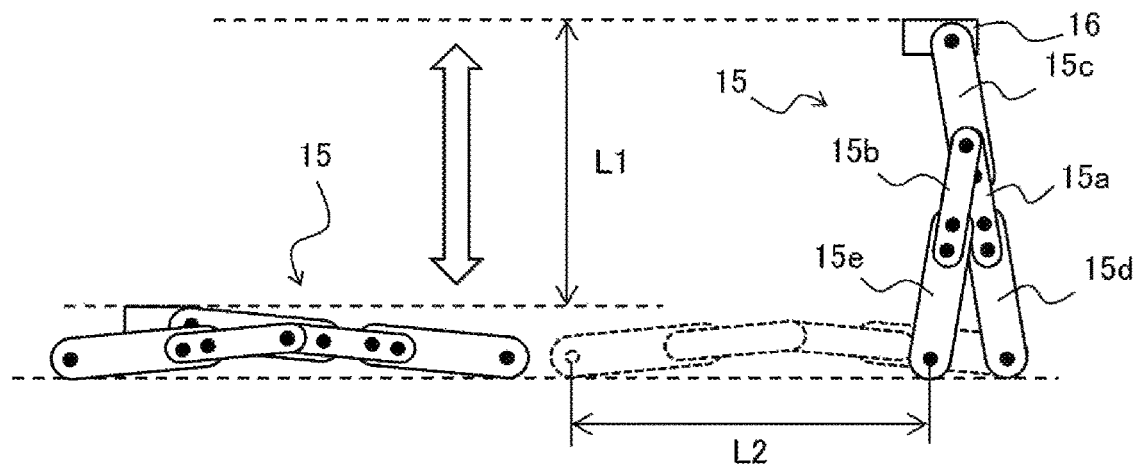
FIG. 15 is a schematic diagram illustrating an operation of the link mechanism according to embodiment 3.
Figure 16:
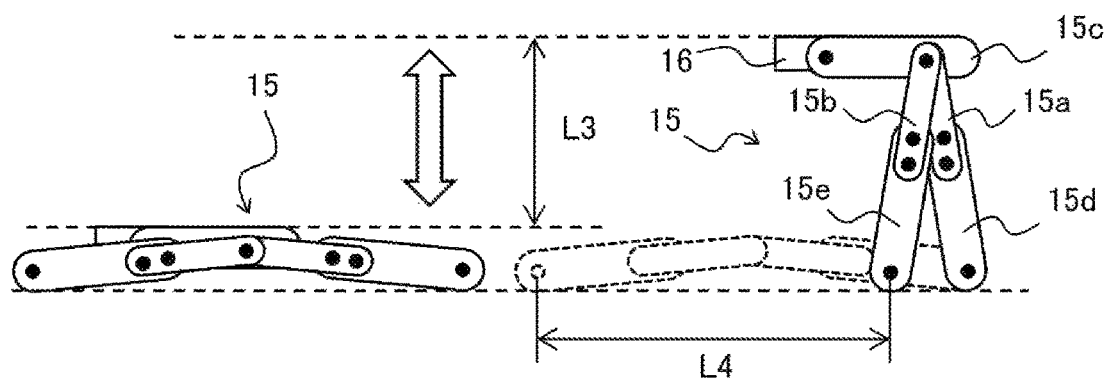
FIG. 16 is a schematic diagram illustrating an operation of the link mechanism according to embodiment 3.
Figure 17:
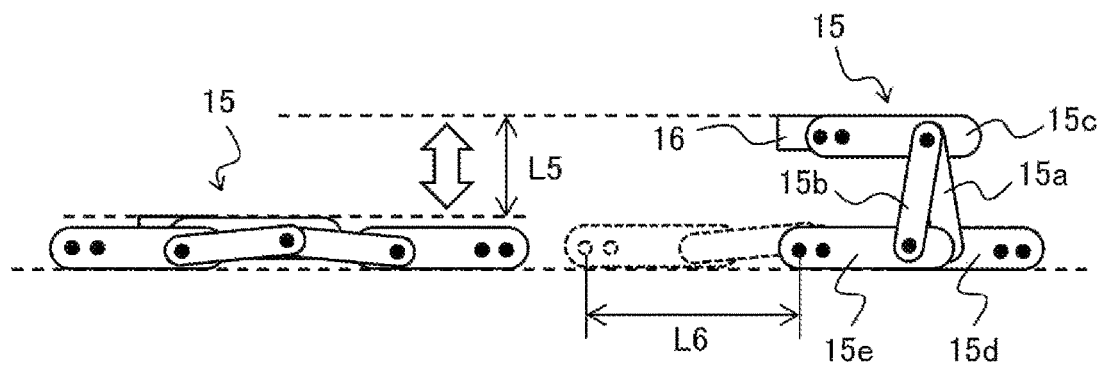
FIG. 17 is a schematic diagram illustrating an operation of the link mechanism according to embodiment 3.

FIG. 15, FIG. 16, and FIG. 17 are each a schematic diagram illustrating an operation of another link mechanism of the present embodiment. In FIG. 15, FIG. 16, and FIG. 17, a state where the link mechanism 15 is contracted is illustrated on the left side, and a state where the link mechanism 15 is extended is illustrated on the right side. FIG. 15 illustrates an operation of the link mechanism 15 in which the expansion link 15c and the expansion link 15d are fixed to the first link 15a, and the expansion link 15e is fixed to the second link 15b. FIG. 16 illustrates an operation of the link mechanism 15 in which the expansion link 15c is fixed to the inspection sensor 16, the expansion link 15d is fixed to the first link 15a, and the expansion link 15e is fixed to the second link 15b. FIG. 17 illustrates an operation of the link mechanism 15 in which the expansion link 15e is fixed to the link connection portion, and the expansion link 15d is fixed to the base. In the link mechanisms illustrated in FIG. 15, FIG. 16, and FIG. 17, a distance between the paired portions is equal among the first link 15a, the second link 15b, and the expansion links 15c, 15d, and 15e.

As illustrated in FIG. 15, in the link mechanism 15 in which the expansion link 15c and the expansion link 15d are fixed to the first link 15a, and the expansion link 15e is fixed to the second link 15b, since the distance between the paired portions is equal among the links, a moving distance L1 of the inspection sensor 16 in a direction orthogonal to a direction of the motion performed by the linear motion mechanism 13 is almost equal to a distance L2 of the motion performed by the linear motion mechanism 13. As illustrated in FIG. 16, in the link mechanism 15 in which the expansion link 15c is fixed to the inspection sensor 16, the expansion link 15d is fixed to the first link 15a, and the expansion link 15e is fixed to the second link 15b, since a distance between the paired portions is equal among the links, a moving distance L3 of the inspection sensor 16 in a direction orthogonal to a direction of the motion performed by the linear motion mechanism 13 is about ½ of a distance L4 of the motion performed by the linear motion mechanism 13. As illustrated in FIG. 17, in the link mechanism 15 in which the expansion link 15e is fixed to the link connection portion and the expansion link 15d is fixed to the base, since a distance between the paired portions is equal among the links, a moving distance L5 of the inspection sensor 16 in a direction orthogonal to a direction of the motion performed by the linear motion mechanism 13 is about ½ of a distance L6 of the motion performed by the linear motion mechanism 13.

In the inspection device of the present embodiment, by selecting components to which the expansion links 15c, 15d, and 15e are to be fixed, the moving distance of the inspection sensor 16 can be changed relative to the distance of the motion performed by the linear motion mechanism 13. For example, as illustrated in FIG. 17, by adopting the link mechanism in which the expansion link 15e is fixed to the link connection portion and the expansion link 15d is fixed to the base, the minimum thrust force required for the linear motion mechanism 13 can be reduced. As a result, the size of the linear motion mechanism can be reduced and the thickness of the inspection device can be reduced.

A movable distance obtained by the linear motion mechanism in the link mechanism 15 illustrated in FIG. 17 is about half a movable distance obtained by the linear motion mechanism in the link mechanisms 15 illustrated in FIG. 15 and FIG. 16. In a case where a speed of the motion performed by the linear motion mechanism is equal, rising of the extension of the link mechanism 15 illustrated in FIG. 17 occurs in a shorter time period than that of the link mechanisms 15 illustrated in FIG. 15 and FIG. 16. Therefore, the link mechanism 15 illustrated in FIG. 17 can enhance a pressing force of the inspection sensor 16 at a shorter distance of the linear motion performed by the linear motion mechanism.

In the link mechanism 15 illustrated in FIG. 14, the expansion links 15c, 15d, and 15e are disposed so as to interpose the first link 15a and the second link 15b therebetween. However, the link mechanism of the present embodiment is not limited to such a structure. For example, as another link mechanism, a link mechanism including at least one of the expansion links 15c, 15d, and 15e of the link mechanism illustrated in FIG. 14, may be used. Furthermore, as another link mechanism, a link mechanism including at least two of the expansion links 15c, 15d, and 15e of the link mechanism illustrated in FIG. 14, may be used. Moreover, the expansion links 15c, 15d, and 15e may be each formed of a plurality of links.

Embodiment 4

Figure 18:
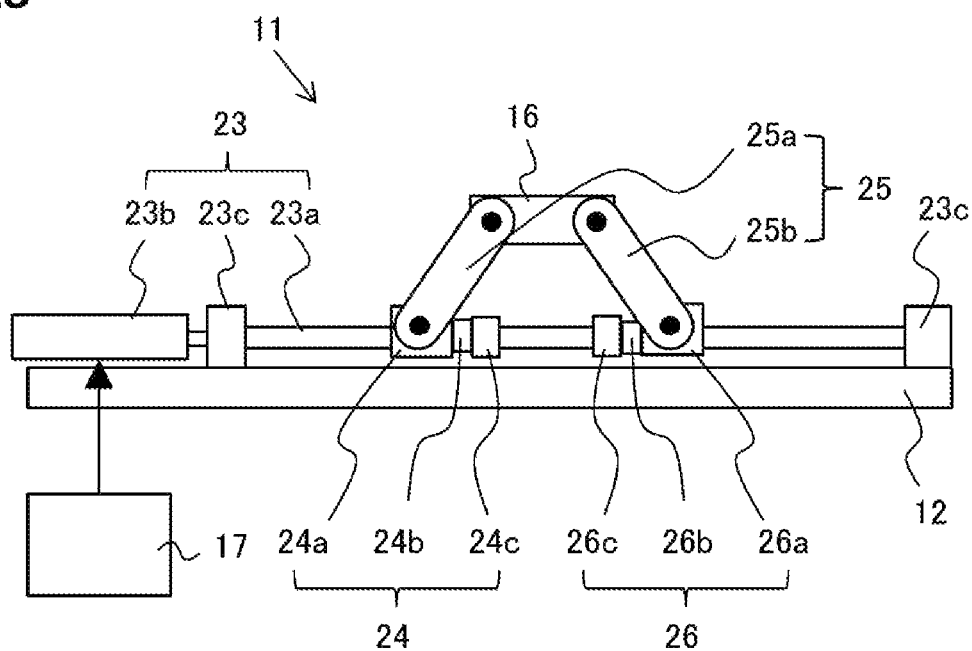
FIG. 18 is a schematic diagram illustrating an inspection device according to embodiment 4.

FIG. 18 is a schematic diagram illustrating an inspection device according to embodiment 4. The inspection device 11 of the present embodiment includes the base 12, an opposing-movement-type linear motion mechanism 23, a first connection mechanism 24, a second connection mechanism 26, a link mechanism 25, and the inspection sensor 16.

The opposing-movement-type linear motion mechanism 23 is, for example, a ball screw mechanism, and is composed of a ball screw 23a, a motor 23b, and a bearing 23c. To the ball screw 23a, the first connection mechanism 24 and the second connection mechanism 26 are connected. The opposing-movement-type linear motion mechanism 23 has a function of linearly moving the first connection mechanism 24 and the second connection mechanism 26 connected to the ball screw 23a over the same distance in opposite directions at the same time. Examples of the mechanism for such an operation include a pair of normal-thread and reverse-thread ball screw mechanisms. In the opposing-movement-type linear motion mechanism 23, the motor 23b rotates in response to a signal from an external remote device 17, and linearly moves the first connection mechanism 24 and the second connection mechanism 26 through the ball screw 23a over the same distance in opposite directions at the same time. For example, when the motor 23b rotates forward, the opposing-movement-type linear motion mechanism 23 moves the first connection mechanism 24 leftward and simultaneously moves the second connection mechanism 26 rightward. When the motor 23b rotates reversely, the opposing-movement-type linear motion mechanism 23 moves the first connection mechanism 24 rightward and simultaneously moves the second connection mechanism 26 leftward.

The first connection mechanism 24 is composed of a first link connection portion 24a, a magnet 24b, and a ball nut 24c. The ball nut 24c is linearly moved by rotation of the ball screw 23a of the opposing-movement-type linear motion mechanism 23. That is, the ball nut 24c is an interlocking portion that moves in conjunction with the linear motion performed by the opposing-movement-type linear motion mechanism 23 at the first connection mechanism 24. The first link connection portion 24a is formed as a metal magnetic body, and is connected to the ball nut 24c by a magnetic attraction force of the magnet 24b. The first link connection portion 24a does not move in direct conjunction with the linear motion performed through the ball screw 23a by the opposing-movement-type linear motion mechanism 23, and is retained with a certain degree of freedom in the direction of the linear motion performed by the opposing-movement-type linear motion mechanism. For example, the first link connection portion 24a is supported by a not-illustrated linear motion guide disposed parallel to a direction of the linear motion performed by the opposing-movement-type linear motion mechanism 23. Alternatively, the first link connection portion 24a has a through hole through which the ball screw 23a penetrates, and the first link connection portion 24a is supported by the ball screw 23a via the through hole. The second connection mechanism 26 is composed of a second link connection portion 26a, a magnet 26b, and a ball nut 26c. The structure of the second connection mechanism 26 is almost the same as the structure of the first connection mechanism 24. The ball nut 26c is linearly moved by rotation of the ball screw 23a of the opposing-movement-type linear motion mechanism 23. That is, the ball nut 26c is an interlocking portion that moves in conjunction with the linear motion performed by the opposing-movement-type linear motion mechanism 23 at the second connection mechanism 26. The second link connection portion 26a does not move in direct conjunction with the linear motion performed through the ball screw 23a by the opposing-movement-type linear motion mechanism 23, and is retained with a certain degree of freedom in the direction of the linear motion performed by the opposing-movement-type linear motion mechanism. The first link connection portion 24a and the second link connection portion 26a are disposed outward of the ball nut 24c and the ball nut 26c, respectively.

A maximum connecting force between the first link connection portion 24a and the ball nut 24c by the magnetic attraction force is set to be higher than a force applied to a force application point in the link mechanism 25 for allowing the inspection sensor 16 to have a pressing force for the inspection, and lower than a force applied to a force application point in the link mechanism 25 for contracting the link mechanism 25 in an emergency operation. Similarly, a maximum connecting force between the second link connection portion 26a and the ball nut 26c by the magnetic attraction force is set to be higher than a force applied to a force application point in the link mechanism 25 for allowing the inspection sensor 16 to have a pressing force for the inspection and lower than a force applied to a force application point in the link mechanism 25 for contacting the link mechanism 25 in an emergency operation.

The link mechanism 25 is composed of a first link 25a and a second link 25b. The link mechanism 25 is structured to have no fulcrum and move by two force application points. The first link 25a and the second link 25b each include joints at both ends. One of the joints of the first link 25a is connected to the first link connection portion 24a. The inspection sensor 16 is connected to the other of the joints of the first link 25a. One of the joints of the second link 25b is connected to the second link connection portion 26a. The inspection sensor 16 is connected to the other of the joints of the second link 25b. The link mechanism 25 transforms the movement of the first link connection portion 24a and the second link connection portion 26a in the left-right direction in FIG. 18 to the movement of the inspection sensor 16 in the up-down direction in FIG. 18. That is, when the first link connection portion 24a and the second link connection portion 26a linearly move so as to be separated from each other, the link mechanism 25 contracts. When the first link connection portion 24a and the second link connection portion 26a linearly move so as to be close to each other, the link mechanism 25 extends.

A stroke of the opposing-movement-type linear motion mechanism 23 needs to be set such that the link mechanism 25 can linearly move and the link mechanism 25 can be most contracted to be minimized. In a case where a distance between paired portions of the first link 25a and a distance between paired portions of the second link 25b are equal to each other, the stroke of the opposing-movement-type linear motion mechanism 23 is set as a length that is four or more times the distance between the paired portions.

Next, a normal operation of the inspection device 11 and an emergency operation therefor will be sequentially described. For simplifying the description, influence of gravity is not referred to in the following description.

Figure 19:
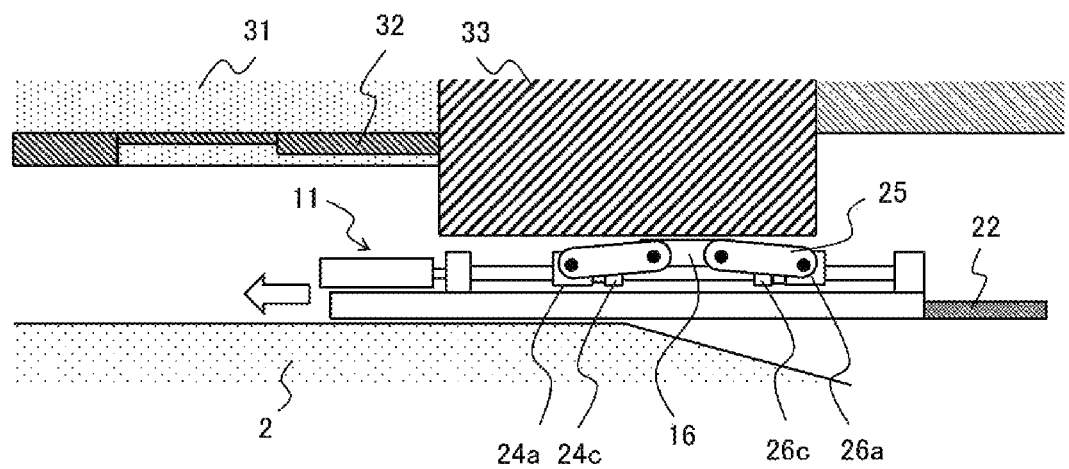
FIG. 19 is a schematic diagram illustrating a normal operation of the inspection device according to embodiment 4.
Figure 20:
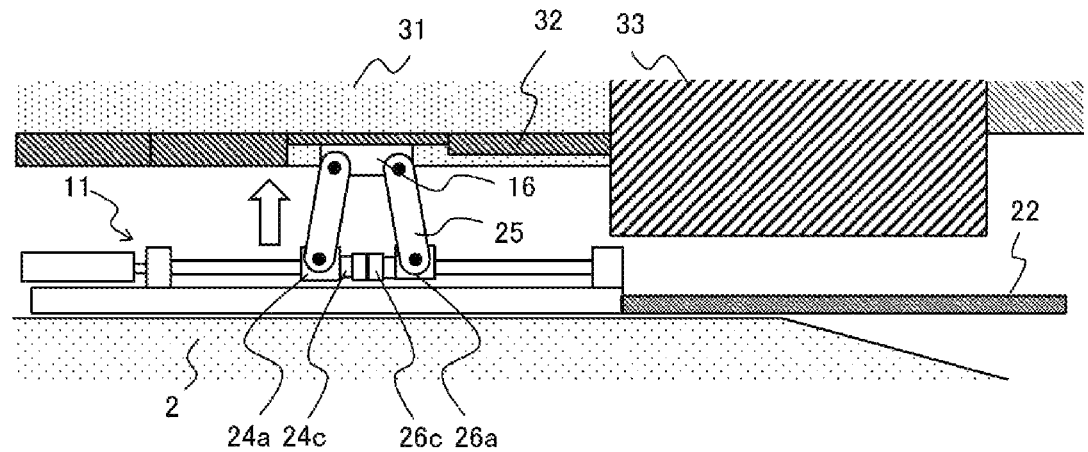
FIG. 20 is a schematic diagram illustrating the normal operation of the inspection device according to embodiment 4.
Figure 21:
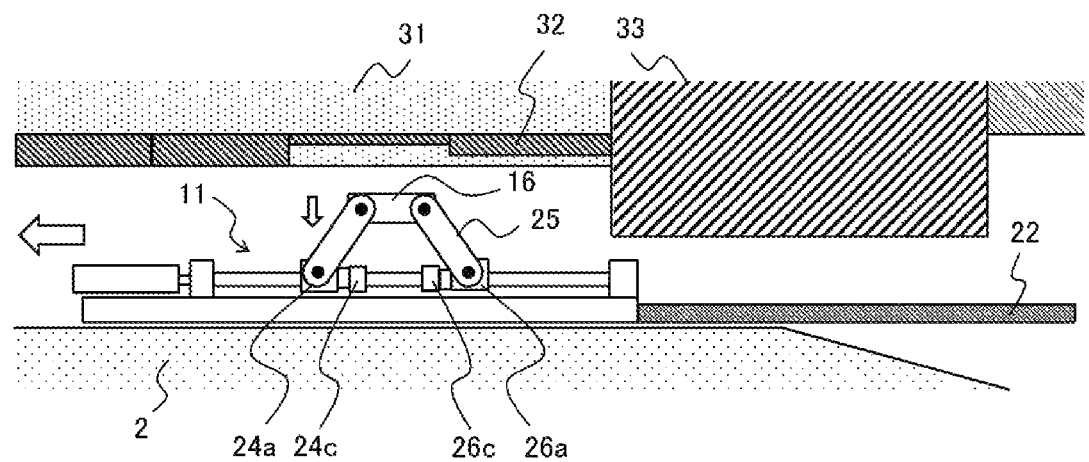
FIG. 21 is a schematic diagram illustrating the normal operation of the inspection device according to embodiment 4.

Firstly, the normal operation of the inspection device 11 will be described. FIG. 19 to FIG. 21 are each a schematic diagram illustrating the normal operation of the inspection device 11 according to the present embodiment. FIG. 19 is a schematic diagram illustrating insertion of the inspection device 11 into the rotary electric machine. As illustrated in FIG. 19, when the inspection device 11 is inserted into the rotary electric machine, the link mechanism 25 is in the most contracted state so as to allow the inspection device 11 to pass through the narrowest gap between the stator 2 and the rotor fastening ring 33. At this time, no external force is applied between the first link connection portion 24a and the ball nut 24c of the first connection mechanism 24 in the compression direction and the separating direction. Therefore, the first link connection portion 24a and the ball nut 24c are connected to each other by the magnetic attraction force of the magnet 24b. Similarly, no external force is applied between the second link connection portion 26a and the ball nut 26c of the second connection mechanism 26 in the compression direction and the separating direction. Therefore, the second link connection portion 26a and the ball nut 26c are connected to each other by the magnetic attraction force of the magnet 26b. As a result, the link mechanism 25 and the opposing-movement-type linear motion mechanism 23 are connected at the first connection mechanism 24 and the second connection mechanism 26.

FIG. 20 is a schematic diagram illustrating inspection of the rotor wedge 32 by the inspection device 11. As illustrated in FIG. 20, when the rotary electric machine is inspected, the link mechanism 25 extends such that the inspection device 11 presses the inspection sensor 16 against the rotor wedge 32. At this time, an external force is applied between the first link connection portion 24a and the ball nut 24c of the first connection mechanism 24 in the separating direction. However, as described above, since the magnetic attraction force of the magnet 24b is higher than the external force, connection between the first link connection portion 24a and the ball nut 24c is maintained. Similarly, connection between the second link connection portion 26a and the ball nut 26c is maintained. As a result, the link mechanism 25 and the opposing-movement-type linear motion mechanism 23 are connected at the first connection mechanism 24 and the second connection mechanism 26.

FIG. 21 is a schematic diagram illustrating movement of the inspection device 11 to a subsequent inspection position. As illustrated in FIG. 21, the inspection device 11 contracts the link mechanism 25 to the intermediate position so as to separate the inspection sensor 16 from the rotor wedge 32. No external force is applied between the first link connection portion 24a and the ball nut 24c of the first connection mechanism 24 in the compression direction and the separating direction, and the first link connection portion 24a and the ball nut 24c are thus connected by the magnetic attraction force of the magnet 24b. Similarly, the second link connection portion 26a and the ball nut 26c are connected by the magnetic attraction force of the magnet 26b. As a result, the link mechanism 25 and the opposing-movement-type linear motion mechanism 23 are connected at the first connection mechanism 24 and the second connection mechanism 26. The inspection device 11 is moved to a subsequent inspection position by the insertion bar 22.

Thus, the operations in FIG. 20 to FIG. 21 are repeated, whereby the inspection device 11 can inspect the rotary electric machine. During the normal operation of the inspection device 11, the first link connection portion 24a, the magnet 24b, and the ball nut 24c are integrally moved in the first connection mechanism 24, and, similarly, the second link connection portion 26a, the magnet 26b, and the ball nut 26c are integrally moved in the second connection mechanism 26.

Next, the emergency operation for the inspection device 11 will be described. FIG. 22 to FIG. 25 are each a schematic diagram illustrating the emergency operation for the inspection device 11 according to the present embodiment. The emergency operation represents an operation of removing the inspection device 11 from the rotary electric machine in a case where abnormality occurs in the inspection device when the inspection device 11 is inspecting the rotor wedge 32. The abnormality in the inspection device represents a state where the opposing-movement-type linear motion mechanism 23 does not operate normally and the extending/contracting operation of the link mechanism 25 cannot be controlled. A case where abnormality occurs in the inspection device 11 in the state illustrated in FIG. 21 is assumed. In a case where abnormality occurs in the inspection device 11 in the state illustrated in FIG. 21, the link mechanism 25 has been extended to the intermediate position. The first link connection portion 24a and the ball nut 24c of the first connection mechanism 24 are connected by the magnetic attraction force of the magnet 24b. Similarly, the second link connection portion 26a and the ball nut 26c of the second connection mechanism 26 are connected by the magnetic attraction force of the magnet 26b.

Figure 22:
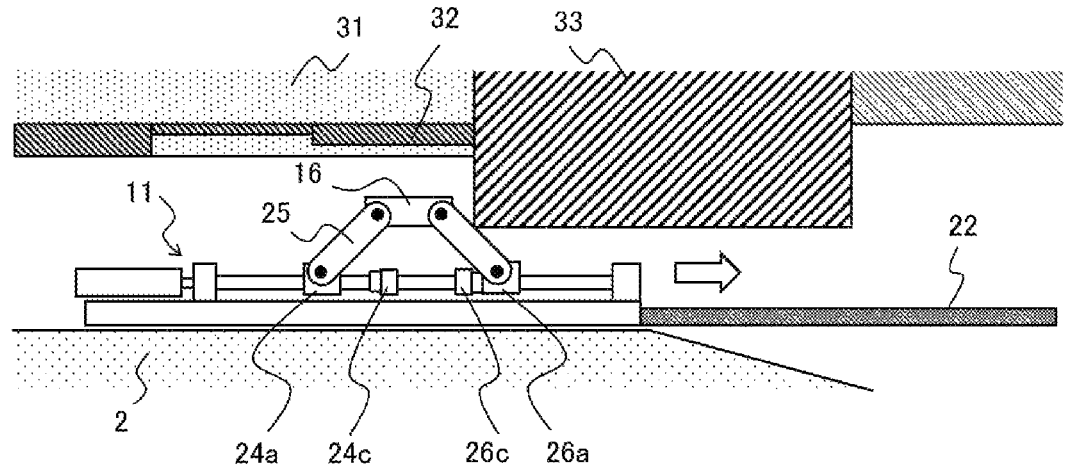
FIG. 22 is a schematic diagram illustrating an emergency operation for the inspection device according to embodiment 4.
Figure 23:
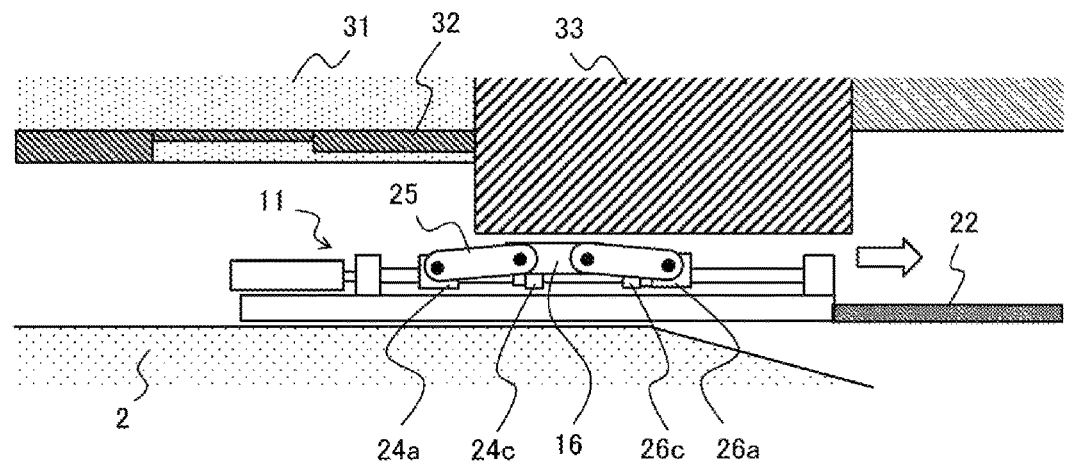
FIG. 23 is a schematic diagram illustrating the emergency operation for the inspection device according to embodiment 4.

FIG. 22 is a schematic diagram illustrating removal of the inspection device 11 from the right side with use of the insertion bar 22. As illustrated in FIG. 22, the link mechanism 25 of the inspection device 11 has been extended, so that the link mechanism 25 comes into contact with the rotor fastening ring 33 on the right side. In a case where a force is further applied in this state to the inspection device 11 in the rightward removal direction by using the insertion bar 22, a force in the direction opposite to the removal direction acts on the link mechanism 25. At this time, a force in the direction opposite to the removal direction acts on the first link connection portion 24a through the link mechanism 25. When the force acting on the first link connection portion 24a becomes higher than the magnetic attraction force by which the first link connection portion 24a and the ball nut 24c are connected, the first link connection portion 24a separates from the ball nut 24c. That is, the maximum connecting force between the first link connection portion 24a and the ball nut 24c is a predetermined force, and, when a force higher than the predetermined force acts on the link mechanism 25, the first link connection portion 24a and the ball nut 24c are disconnected. The first link connection portion 24a has a certain degree of freedom in the linear motion direction, and is thus separated from the ball nut 24c along the linear motion direction. FIG. 22 illustrates a state where the first link connection portion 24a is separated from the ball nut 24c. The first link connection portion 24a is moved so as to be separated from the ball nut 24c, whereby the link mechanism 25 contracts. As a result, the position of the inspection sensor 16 is lowered, and the link mechanism 25 contracts so as to allow the inspection device 11 to pass through a gap between the rotor fastening ring 33 on the right side and the stator 2. FIG. 23 illustrates a state where the inspection device 11 passes through the gap between the rotor fastening ring 33 on the right side and the stator 2. Thus, even in a case where abnormality occurs in the inspection device 11, the inspection device 11 can be removed from the rotary electric machine.

Figure 24:
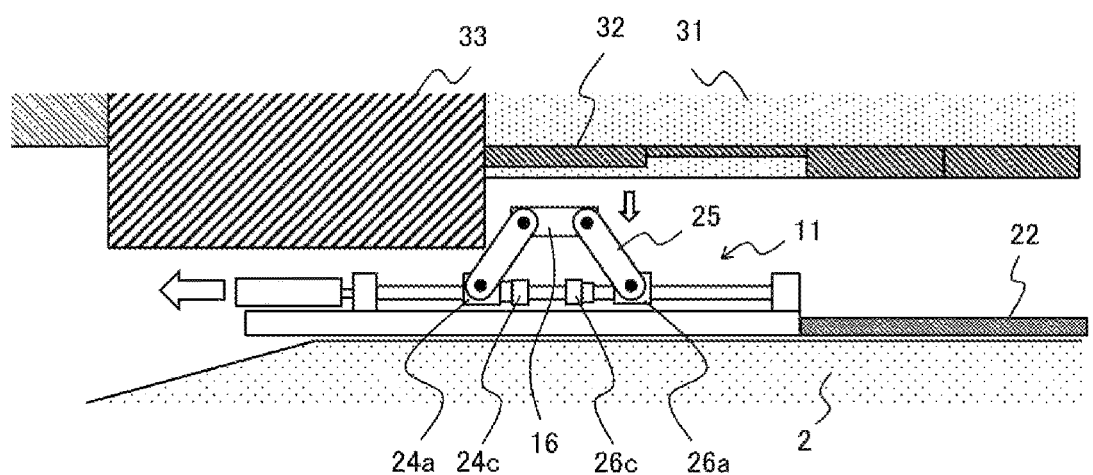
FIG. 24 is a schematic diagram illustrating the emergency operation for the inspection device according to embodiment 4.
Figure 25:
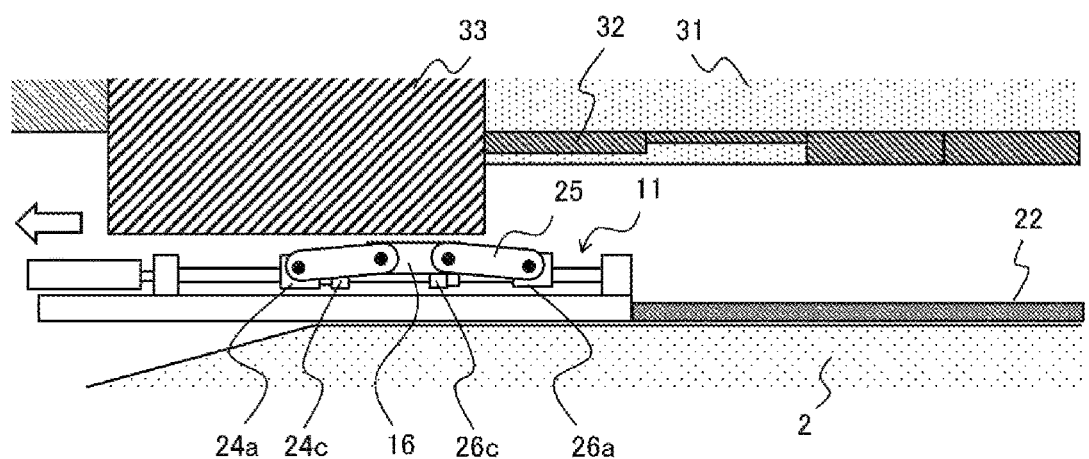
FIG. 25 is a schematic diagram illustrating the emergency operation for the inspection device according to embodiment 4.

FIG. 24 is a schematic diagram illustrating removal of the inspection device 11 from the left side with use of the insertion bar 22. As illustrated in FIG. 24, the link mechanism 25 of the inspection device 11 has been extended, so that the link mechanism 25 comes into contact with the rotor fastening ring 33 on the left side. In a case where a force is further applied in this state to the inspection device 11 in the leftward removal direction by using the insertion bar 22, a force in the direction opposite to the removal direction acts on the link mechanism 25. At this time, a force in the direction opposite to the removal direction acts on the second link connection portion 26a through the link mechanism 25. When the force acting on the second link connection portion 26a becomes higher than the magnetic attraction force by which the second link connection portion 26a and the ball nut 26c are connected, the second link connection portion 26a separates from the ball nut 26c. That is, the maximum connecting force between the second link connection portion 26a and the ball nut 26c is a predetermined force, and, when a force higher than the predetermined force acts on the link mechanism 25, the second link connection portion 26a and the ball nut 26c are disconnected. The second link connection portion 26a has a certain degree of freedom in the linear motion direction, and is thus separated from the ball nut 26c along the linear motion direction. FIG. 24 illustrates a state where the second link connection portion 26a is separated from the ball nut 26c. The second link connection portion 26a is moved so as to be separated from the ball nut 26c, whereby the link mechanism 25 contracts. As a result, the position of the inspection sensor 16 is lowered, and the link mechanism 25 contracts so as to allow the inspection device 11 to pass through a gap between the rotor fastening ring 33 on the left side and the stator 2. FIG. 25 illustrates a state where the inspection device 11 passes through the gap between the rotor fastening ring 33 on the left side and the stator 2. Thus, even in a case where abnormality occurs in the inspection device 11, the inspection device 11 can be removed from the rotary electric machine.

For the emergency operation, a case where abnormality occurs in the inspection device 11 in the state illustrated in FIG. 21 has been described. In a case where abnormality occurs in the state illustrated in FIG. 20, when the inspection device 11 is removed by using the insertion bar 22, the inspection sensor 16 comes into contact with the stepped portion of the rotor wedge 32. Also in this case, in a case where a force is further applied to the inspection device 11 in the removal direction by using the insertion bar 22, a force in the direction opposite to the removal direction acts on the link mechanism 25 through the inspection sensor 16. By the force, the first link connection portion 24a is separated from the ball nut 24c or the second link connection portion 26a is separated from the ball nut 26c, so that the link mechanism 25 contracts. As a result, the inspection device 11 can be removed from the rotary electric machine.

In the inspection device having such a structure, in a case where an overload acts on the first connection mechanism or the second connection mechanism, the ball nut and the first link connection portion or the second link connection portion are disconnected, and the first link connection portion or the second link connection portion is separated from the ball nut, whereby the link mechanism 25 contracts. As a result, even in a case where the opposing-movement-type linear motion mechanism as the drive unit for an operation of extending/contracting the link mechanism does not operate normally, the inspection device can be removed without removing the rotor from the rotary electric machine and causing damage to the rotary electric machine and the inspection device. Furthermore, the inspection device can be removed by moving the inspection device in either direction. Therefore, the inspection device can be quickly removed from the end portion, of the rotary electric machine, closer to a position at which abnormality has occurred.

Embodiment 5

Figure 26:
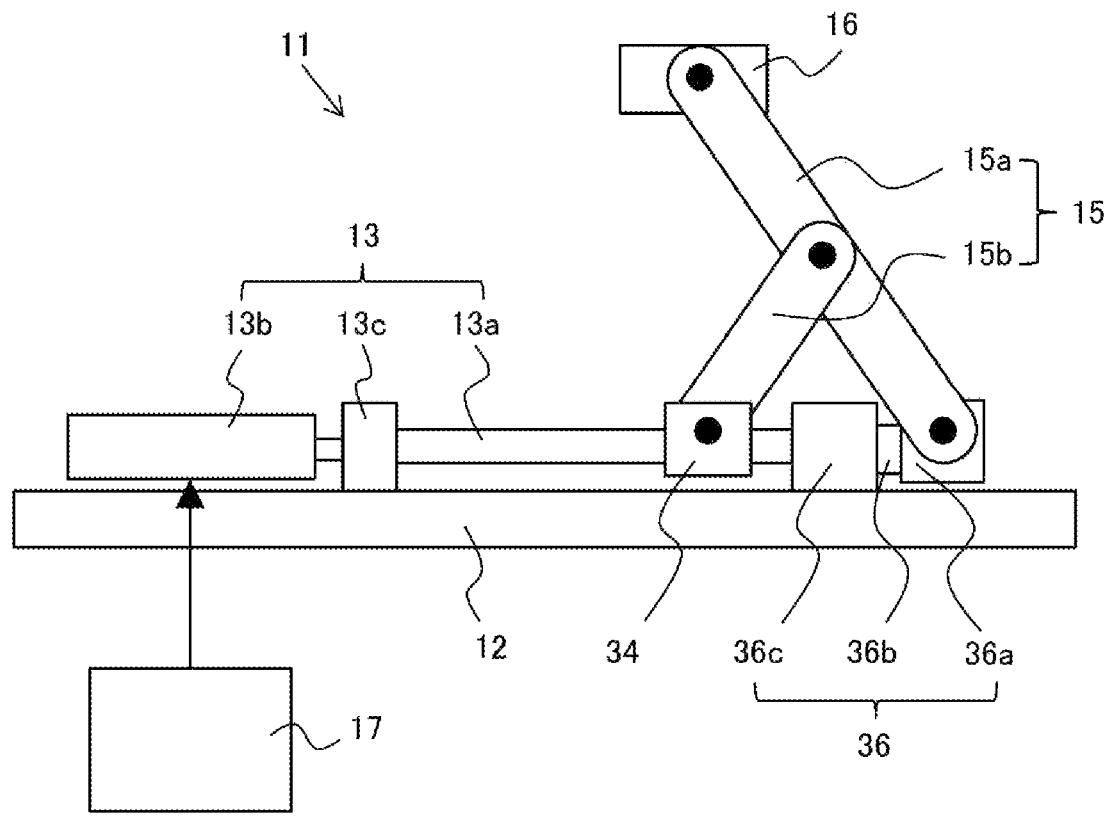
FIG. 26 is a schematic diagram illustrating an inspection device according to embodiment 5.

FIG. 26 is a schematic diagram illustrating an inspection device according to embodiment 5. The inspection device 11 is composed of the elongated base 12, the linear motion mechanism 13, a third connection mechanism 34, the link mechanism 15, a fourth connection mechanism 36, and the inspection sensor 16. The base 12 is, for example, a metal member to which the linear motion mechanism 13, the fourth connection mechanism 36, and the like are mounted.

The linear motion mechanism 13 is, for example, a ball screw mechanism, and is composed of a ball screw 13a, a motor 13b, and a bearing 13c. The third connection mechanism 34 is connected to the ball screw 13a. The linear motion mechanism 13 rotates the motor 13b in response to a signal from an external remote device 17 and linearly moves the third connection mechanism 34 through the ball screw 13a. The third connection mechanism 34 moves in conjunction with the linear motion performed by the linear motion mechanism 13.

The fourth connection mechanism 36 is composed of a link connection portion 36a, a magnet 36b, and a fixing portion 36c. The fixing portion 36c is fixed to the base 12. The magnet 36b is fixed to the fixing portion 36c. The link connection portion 36a is formed as a metal magnetic body, and is connected to the fixing portion 36c by a magnetic attraction force of the magnet 36b. The link connection portion 36a may be structured to incorporate a magnet other than the magnet 36b. The link connection portion 36a is not connected directly to the base 12 and is connected to the fixing portion 36c by the magnetic attraction force of the magnet 36b. That is, the link connection portion 36a is a separable portion in the fourth connection mechanism 36. In a case where no external force is applied, the link connection portion 36a and the fixing portion 36c of the fourth connection mechanism 36 are connected by the magnetic attraction force of the magnet 36b. Form the viewpoint that the link connection portion 36a and the fixing portion 36c need to be connected by a magnetic attraction force, the magnet 36b may be fixed to the link connection portion 36a. In this case, the fixing portion 36c needs to be formed as a magnetic body or needs to incorporate another magnet.

A maximum connecting force between the link connection portion 36a and the fixing portion 36c by the magnetic attraction force is set to be higher than a force applied to a force application point in the link mechanism 15 for allowing the inspection sensor 16 to have a pressing force and lower than a force applied to a force application point in the link mechanism 15 for contracting the link mechanism 15 in an emergency operation.

The link mechanism 15 is composed of a first link 15a and a second link 15b. The first link 15a and the second link 15b each include joints at both ends. One of the joints of the first link 15a is connected to the link connection portion 36a. The inspection sensor 16 is connected to the other of the joints of the first link 15a. One of the joints of the second link 15b is connected to the third connection mechanism 34. The other of the joints of the second link 15b is connected to almost the center of the first link 15a in a rotatable manner. In the link mechanism 15 having such a structure, the first link 15a acts as a driven link and the second link 15b acts as a driving link.

In the normal operation of the inspection device 11 having such a structure, when the link mechanism 15 extends to press the inspection sensor 16 against the rotor wedge 32, an external force is applied between the link connection portion 36a and the fixing portion 36c of the fourth connection mechanism 36 in the separating direction. In this case, since the magnetic attraction force of the magnet 36b is higher than the external force, connection between the link connection portion 36a and the fixing portion 36c by the magnetic attraction force of the magnet 36b is maintained.

Next, in the emergency operation for the inspection device 11, in a case where the inspection device 11 is moved in the removal direction, since the link mechanism 15 of the inspection device 11 has been extended, the link mechanism 15 comes into contact with the rotor fastening ring. In a case where a force is further applied in this state to the inspection device 11 in the removal direction, a force in the direction opposite to the removal direction acts on the link mechanism 15. At this time, a force in the same direction as the removal direction acts on the link connection portion 36a of the fourth connection mechanism 36 through the link mechanism 15. When the force acting on the link connection portion 36a becomes higher than the magnetic attraction force by which the link connection portion 36a and the fixing portion 36c are connected, the link connection portion 36a is separated from the fixing portion 36c. That is, the maximum connecting force between the link connection portion 36a and the fixing portion 36c is a predetermined force, and, when a force higher than the predetermined force acts on the link mechanism 15, the link connection portion 36a and the fixing portion 36c are disconnected. The link connection portion 36a is moved so as to be separated from the fixing portion 36c, whereby the link mechanism 15 contracts. As a result, the position of the inspection sensor 16 is lowered, and the link mechanism 15 contracts so as to allow the inspection device 11 to pass through a gap between the rotor fastening ring and the stator. Thus, even in a case where abnormality occurs in the inspection device 11, the inspection device 11 can be removed from the rotary electric machine.

In the inspection device having such a structure, in a case where an overload acts on the fourth connection mechanism, the link connection portion and the fixing portion are disconnected and the link connection portion is separated from the fixing portion. Therefore, even in a case where the linear motion mechanism as the drive unit for an operation of extending/contracting the link mechanism does not operate normally, the link mechanism contracts. As a result, the inspection device can be removed without removing the rotor from the rotary electric machine and causing damage to the rotary electric machine and the inspection device.

Embodiment 6

Figure 27:
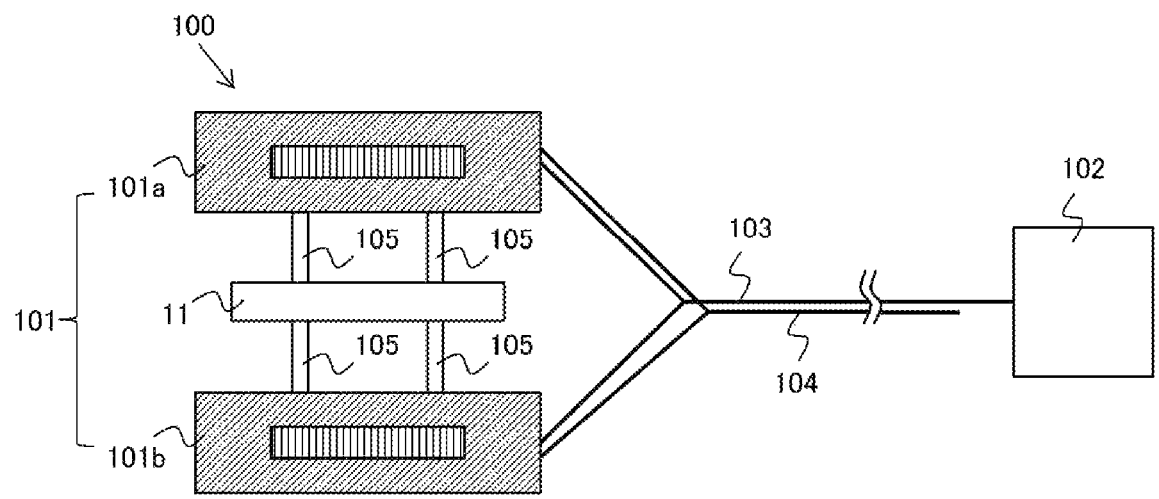
FIG. 27 is a schematic diagram illustrating an inspection system according to embodiment 6.

FIG. 27 is a schematic diagram illustrating an inspection system according to embodiment 6. The inspection system of the present embodiment includes the inspection device of embodiment 1. As illustrated in FIG. 27, an inspection system 100 of the present embodiment includes the inspection device 11, a movable body 101, a control unit 102, a control cable 103, and an emergency rope 104. The movable body 101 is composed of a first movable body 101a and a second movable body 101b. The first movable body 101a and the second movable body 101b each include a traveling apparatus such as an endless track. The inspection device 11 is joined to the first movable body 101a and the second movable body 101b at a position between the first movable body 101a and the second movable body 101b by using connecting members 105. The control unit 102 outputs control signals for controlling the movable body 101 and the inspection device 11. The control cable 103 transmits control signals outputted by the control unit 102 to the movable body 101 and the inspection device 11. The emergency rope 104 is connected to the movable body 101, and is used when the movable body 101 is removed from the rotary electric machine in a case where a failure occurs in the traveling apparatus of the movable body 101. Although, in FIG. 27, the control cable 103 and the emergency rope 104 are connected to the movable body 101, the control cable 103 and the emergency rope 104 may be connected to the inspection device 11. The control cable 103 may serve also as the emergency rope 104 without providing the emergency rope 104.

Figure 28:
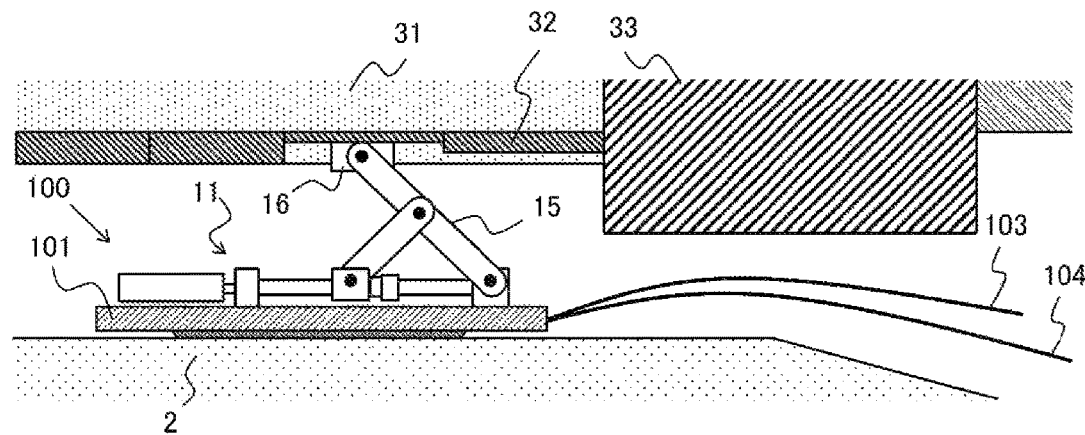
FIG. 28 is a schematic diagram illustrating an operation of the inspection system according to embodiment 6.
Figure 29:
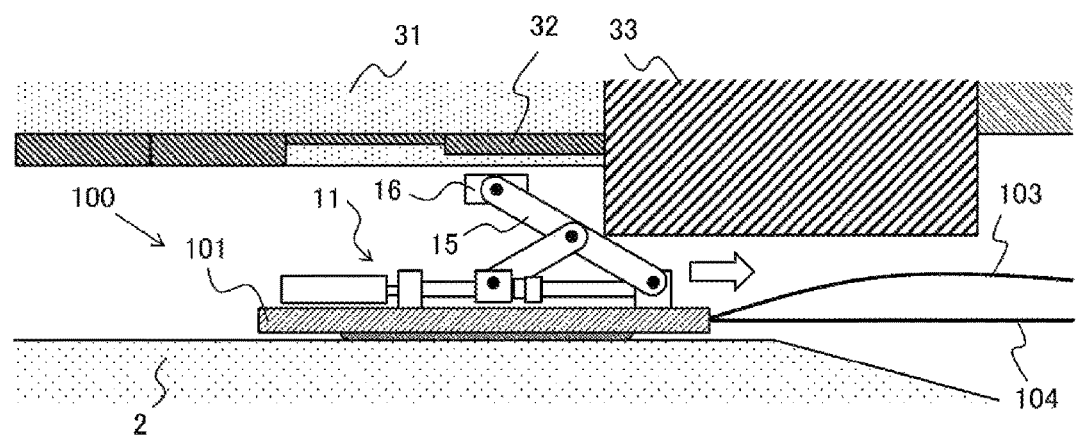
FIG. 29 is a schematic diagram illustrating the operation of the inspection system according to embodiment 6.
Figure 30:
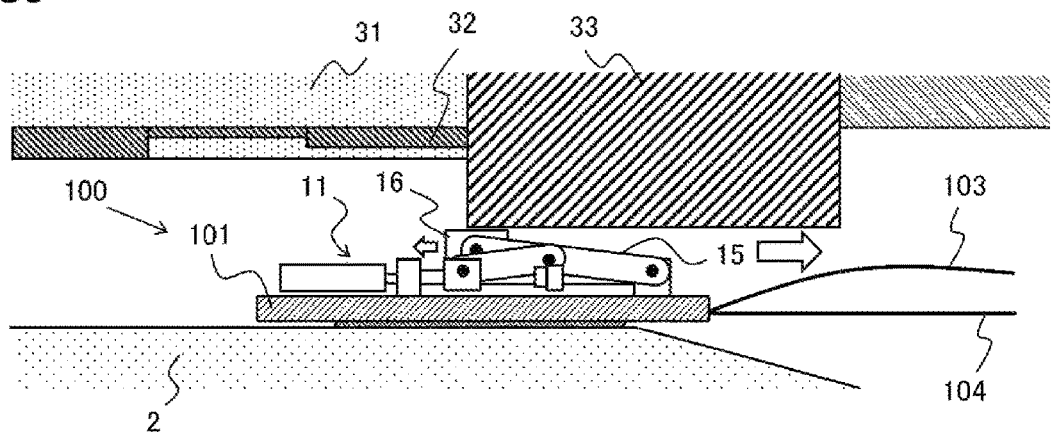
FIG. 30 is a schematic diagram illustrating the operation of the inspection system according to embodiment 6.

FIG. 28 to FIG. 30 are each a schematic diagram illustrating an example of an operation of the inspection system 100 of the present embodiment. The inspection system 100 moves in a state where the movable body 101 is in contact with the inner circumferential surface of the stator 2. When the inspection system 100 has reached a predetermined position, the inspection system 100 presses the inspection sensor 16 of the inspection device 11 against the rotor wedge 32 and preforms the inspection.

FIG. 28 illustrates a normal operation of the inspection system 100. The inspection system 100 is moved, by the movable body 101, to an inspection position. The inspection system 100 repeatedly performs an operation of extending the link mechanism for pressing the inspection sensor 16 against the rotor wedge 32, and an operation of contracting the link mechanism for separating the inspection sensor 16 from the rotor wedge 32. Thus, the inspection system 100 inspects the rotor 3 while moving on the inner circumferential surface of the stator 2.

FIG. 29 illustrates a state where abnormality has occurred in the linear motion mechanism of the inspection device 11. In this state, by moving the movable body 101 backward, the inspection system 100 is moved to the end portion of the rotor fastening ring 33. In a case where abnormality occurs in the traveling apparatus of the movable body 101 in addition to abnormality occurring in the linear motion mechanism, the emergency rope 104 provided in the inspection system 100 is pulled from the outside of the rotary electric machine, to move the inspection system 100 to the end portion of the rotor fastening ring 33.

FIG. 30 illustrates a state where the inspection system 100 passes through a gap between the rotor fastening ring 33 and the stator 2. The inspection system 100 that has reached the end portion of the rotor fastening ring 33 further moves the movable body 101 backward. Alternatively, by further pulling the emergency rope 104, a function of the emergency operation for the inspection device 11 operates. That is, the link connection portion and the ball nut of the connection mechanism of the inspection device 11 are disconnected, and the link connection portion is separated from the ball nut, whereby the link mechanism 15 contracts. As a result, as illustrated in FIG. 30, the inspection system 100 can pass through the gap between the rotor fastening ring 33 and the stator 2.

The inspection system of the present embodiment includes the inspection device of embodiment 1. The inspection system may include the inspection device of any of embodiments 2 to 5 instead of the inspection device of embodiment 1.

Although the present disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the present disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotary electric machine
2 stator
3 rotor
11 inspection device
12 base
13 linear motion mechanism 13a, 23a ball screw
13b, 23b motor
13c, 23c bearing
14 connection mechanism
14a, 36a link connection portion
14b, 24b, 26b, 36b magnet
14c, 24c, 26c ball nut
15, 25 link mechanism
15a, 25a first link
15b, 25b second link
15c, 15d, 15e expansion link
16 inspection sensor
17 remote device
18 holding magnet
22 insertion bar
23 opposing-movement-type linear motion mechanism
24 first connection mechanism
24a first link connection portion
26 second connection mechanism
26a second link connection portion
31 rotor shaft
32 rotor wedge
33 rotor fastening ring
34 third connection mechanism
36 fourth connection mechanism
36c fixing portion
100 inspection system
101 movable body
102 control unit
103 control cable
104 emergency rope
105 connecting member

The invention claimed is:

1. An inspection device for a rotary electric machine, the inspection device comprising:
   a base;
   a linear motion mechanism mounted to the base for performing linear motion relative to the base through a range of motion;
   a link mechanism which has a driving link, and a driven link that is connected to the base, and which extends/contracts relative to the base, by the linear motion performed by the linear motion mechanism, in a direction intersecting a direction of the linear motion;
   a connection mechanism for connecting between the driving link of the link mechanism and the linear motion mechanism; and
   a sensor mounted to the link mechanism, wherein
   the connection mechanism has a link connection portion connected to the driving link, and an interlocking portion that is connected to the link connection portion and that moves in conjunction with the linear motion performed by the linear motion mechanism while being connected with the link connection portion through the range of motion, and
   when a force higher than or equal to a predetermined force is applied to the link mechanism, the link connection portion and the interlocking portion are disconnected, and the link connection portion is separated from the interlocking portion so as to contract the link mechanism.

2. The inspection device, for a rotary electric machine, according to claim 1, wherein
   the connection mechanism includes a magnet, and
   the link connection portion and the interlocking portion are connected by a magnetic attraction force of the magnet.

3. The inspection device, for a rotary electric machine, according to claim 1, wherein the base further includes a holding magnet for holding the link connection portion by a magnetic attraction force when the link mechanism is in a most contracted state.

4. The inspection device, for a rotary electric machine, according to claim 1, wherein
   the link mechanism includes a main link section having the driving link and the driven link, and an expansion section for connecting between the main link section and the sensor, and
   the expansion section is fixed to the main link section or the sensor.

5. The inspection device, for a rotary electric machine, according to claim 4, wherein the expansion section is composed of a plurality of links.

6. The inspection device, for a rotary electric machine, according to claim 1, wherein
   the link mechanism includes a main link section having the driving link and the driven link, and an expansion section for connecting between the driven link and the base, and
   the expansion section is fixed to the driven link or the base.

7. The inspection device, for a rotary electric machine, according to claim 6, wherein the expansion section is composed of a plurality of links.

8. The inspection device, for a rotary electric machine, according to claim 1, wherein
   the link mechanism includes a main link section having the driving link and the driven link, and an expansion section for connecting between the driving link and the link connection portion, and
   the expansion section is fixed to the driving link or the link connection portion.

9. The inspection device, for a rotary electric machine, according to claim 8, wherein the expansion section is composed of a plurality of links.

10. An inspection device for a rotary electric machine, the inspection device comprising:
    a base;
    an opposing-movement-type linear motion mechanism mounted to the base for performing linear motion relative to the base through a range of motion;
    a link mechanism which has a first link and a second link each having at least one joint, and which extends/contracts relative to the base, by the linear motion performed by the opposing-movement-type linear motion mechanism, in a direction intersecting a direction of the linear motion;
    two connection mechanisms for connecting between one of the joints of the first link and the opposing-movement-type linear motion mechanism, and between one of the joints of the second link and the opposing-movement-type linear motion mechanism; and
    a sensor mounted to the link mechanism, wherein
    the opposing-movement-type linear motion mechanism has a function of linearly moving the two connection mechanisms over a same distance in opposite directions at a same time,
    the two connection mechanisms each have a link connection portion connected to one of the joints, and an interlocking portion that is connected to the link connection portion and that moves in conjunction with the linear motion performed by the opposing-movementtype linear motion mechanism while being connected with the link connection portion through the range of motion, and, when a force higher than or equal to a predetermined force is applied to the link mechanism, the link connection portion and the interlocking portion of one of the connection mechanisms are disconnected, and the link connection portion is separated from the interlocking portion so as to contract the link mechanism.

11. An inspection device for a rotary electric machine, the inspection device comprising:
a base;
a linear motion mechanism mounted to the base for performing linear motion relative to the base through a range of motion;
a link mechanism which has a driving link connected to the linear motion mechanism, and a driven link, and which extends/contracts relative to the base, by the linear motion performed by the linear motion mechanism, in a direction intersecting a direction of the linear motion;
a connection mechanism for connecting between the driven link and the base; and
a sensor mounted to the link mechanism, wherein
the connection mechanism has a link connection portion connected to the driven link, and a fixing portion that is connected to the link connection portion while the linear motion is performed by the linear motion mechanism through the range of motion and that is fixed to the base, and,
when a force higher than or equal to a predetermined force is applied to the link mechanism, the link connection portion and the fixing portion are disconnected, and the link connection portion is separated from the fixing portion so as to contract the link mechanism.

12. An inspection system for a rotary electric machine, the inspection system comprising:
the inspection device, for a rotary electric machine, according to claim 1;
a movable body joined to the inspection device;
a controller to output a control signal for controlling each of the inspection device and the movable body; and
a control cable, connected between the controller and at least one of the inspection device and the movable body, for transmitting the control signal.

13. An inspection system for a rotary electric machine, the inspection system comprising:
the inspection device, for a rotary electric machine, according to claim 10;
a movable body joined to the inspection device;
a controller to output a control signal for controlling each of the inspection device and the movable body; and
a control cable, connected between the controller and at least one of the inspection device and the movable body, for transmitting the control signal.

14. An inspection system for a rotary electric machine, the inspection system comprising:
the inspection device, for a rotary electric machine, according to claim 11;
a movable body joined to the inspection device;
a controller to output a control signal for controlling each of the inspection device and the movable body; and
a control cable, connected between the controller and at least one of the inspection device and the movable body, for transmitting the control signal.

* * * * *